(12) United States Patent
Ren et al.

(10) Patent No.: US 10,789,483 B1
(45) Date of Patent: *Sep. 29, 2020

(54) IMAGE BASED INVENTORY ITEM COUNTING

(71) Applicant: Amazon Technologies, Inc., Seattle, WA (US)

(72) Inventors: Xiaofeng Ren, Yarrow Point, WA (US); Avishkar Misra, Redmond, WA (US); Ohil Krishnamurthy Manyam, Bothell, WA (US); Liefeng Bo, Seattle, WA (US); Sudarshan Narasimha Raghavan, Snoqualmie, WA (US); Christopher Robert Towers, Seattle, WA (US); Gopi Prashanth Gopal, Redmond, WA (US); Yasser Baseer Asmi, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/195,016

(22) Filed: Nov. 19, 2018

Related U.S. Application Data

(63) Continuation of application No. 14/578,021, filed on Dec. 19, 2014, now Pat. No. 10,169,660.

(51) Int. Cl.
*G06K 9/00* (2006.01)
*G06K 9/62* (2006.01)
(Continued)

(52) U.S. Cl.
CPC ....... *G06K 9/00771* (2013.01); *G06K 9/6202* (2013.01); *G06K 9/6212* (2013.01);
(Continued)

(58) Field of Classification Search
None
See application file for complete search history.

(56) References Cited

U.S. PATENT DOCUMENTS

| | | | | |
|---|---|---|---|---|
| 6,164,537 A | * | 12/2000 | Mariani | A01G 9/143 235/383 |
| 7,225,980 B2 | | 6/2007 | Ku et al. | |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Soo Shin
(74) *Attorney, Agent, or Firm* — Athorus, PLLC

(57) ABSTRACT

Described is a system for counting stacked items using image analysis. In one implementation, an image of an inventory location with stacked items is obtained and processed to determine the number of items stacked at the inventory location. In some instances, the item closest to the camera that obtains the image may be the only item viewable in the image. Using image analysis, such as depth mapping or Histogram of Oriented Gradients (HOG) algorithms, the distance of the item from the camera and the shelf of the inventory location can be determined. Using this information, and known dimension information for the item, a count of the number of items stacked at an inventory location may be determined.

20 Claims, 19 Drawing Sheets

(51) Int. Cl.
  *G06Q 10/08* (2012.01)
  *H04L 29/08* (2006.01)
(52) U.S. Cl.
  CPC ........ *G06K 9/6218* (2013.01); *G06Q 10/087* (2013.01); *H04L 67/10* (2013.01)

(56) References Cited

U.S. PATENT DOCUMENTS

| | | | |
|---|---|---|---|
| 7,693,758 | B1 | 4/2010 | Bacco et al. |
| 7,949,568 | B2 | 5/2011 | Fano et al. |
| 8,009,864 | B2 | 8/2011 | Linaker et al. |
| 8,175,925 | B1 | 5/2012 | Rouaix |
| 8,189,855 | B2 | 5/2012 | Opalach et al. |
| 8,423,431 | B1 | 4/2013 | Rouaix et al. |
| 8,473,374 | B2* | 6/2013 | Allison ................ A47F 5/0823 705/28 |
| 8,630,924 | B2 | 1/2014 | Groenevelt et al. |
| 8,688,598 | B1 | 4/2014 | Shakes et al. |
| 9,120,621 | B1 | 9/2015 | Curlander et al. |
| 9,152,862 | B2 | 10/2015 | Ross et al. |
| 9,245,170 | B1* | 1/2016 | Nikic ...................... G01S 17/89 |
| 9,367,770 | B2 | 6/2016 | Footen |
| 9,367,831 | B1* | 6/2016 | Besehanic ............ G06Q 10/087 |
| 9,473,747 | B2 | 10/2016 | Kobres et al. |
| 2003/0002712 | A1 | 1/2003 | Steenburgh et al. |
| 2004/0181467 | A1 | 9/2004 | Raiyani et al. |
| 2005/0021425 | A1* | 1/2005 | Casey .................... G06Q 10/08 705/28 |
| 2008/0055087 | A1* | 3/2008 | Horii ...................... G03B 21/13 340/572.1 |
| 2008/0077511 | A1 | 3/2008 | Zimmerman |
| 2008/0082426 | A1* | 4/2008 | Gokturk ............. G06Q 30/0625 705/26.62 |
| 2008/0109114 | A1 | 5/2008 | Orita et al. |
| 2008/0306787 | A1* | 12/2008 | Hamilton ............... G06Q 10/06 705/7.38 |
| 2009/0063307 | A1* | 3/2009 | Groenovelt .......... G06Q 10/087 705/28 |
| 2009/0121017 | A1 | 5/2009 | Cato et al. |
| 2009/0245573 | A1 | 10/2009 | Saptharishi et al. |
| 2011/0011936 | A1 | 1/2011 | Morandi et al. |
| 2012/0046044 | A1* | 2/2012 | Jamtgaard ............... H04W 4/029 455/456.1 |
| 2012/0140987 | A1* | 6/2012 | Singh ................... G06K 9/4652 382/103 |
| 2012/0284132 | A1 | 11/2012 | Kim et al. |
| 2012/0323620 | A1* | 12/2012 | Hofman ................. G06Q 10/06 705/7.11 |
| 2013/0076898 | A1 | 3/2013 | Philippe et al. |
| 2013/0253700 | A1 | 9/2013 | Carson et al. |
| 2014/0003729 | A1* | 1/2014 | Auclair ................ G06K 9/6292 382/224 |
| 2014/0279294 | A1 | 9/2014 | Field-Darragh et al. |
| 2015/0016712 | A1* | 1/2015 | Rhoads ............... G06K 9/00208 382/154 |
| 2015/0019391 | A1 | 1/2015 | Kumar et al. |
| 2015/0052029 | A1 | 2/2015 | Wu et al. |
| 2015/0055821 | A1* | 2/2015 | Fotland ................ G06K 9/3241 382/103 |
| 2015/0073907 | A1 | 3/2015 | Purves et al. |
| 2015/0262116 | A1 | 9/2015 | Katircioglu et al. |
| 2015/0379366 | A1* | 12/2015 | Nomura ............... G06K 9/6218 382/203 |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

Fujisawa et al., Pedestrian Counting in Video Sequences based on Optical Flow Clustering, ACA'12 Proceedings of the 11th international conference on Application of Electrical and Computer Engineering, 2012, pp. 51-56.

Mason et al., "Object Disappearance for Object Discovery," Intelligent Robots and Systems (IROS), 2012 IEEE/RSJ International Conference on, pp. 2836-2843, IEEE, 2012.

Vijayanarasimhan and Grauman, "Efficient Region Search for Object Detection," IEEE Conference on Computer Vision and Pattern Recognition (CVPR), 2011, pp. 1401-1408.

\* cited by examiner

IMAGE BASED INVENTORY ITEM COUNTING

PRIORITY CLAIM

This application is a continuation of U.S. patent application Ser. No. 14/578,021, filed Dec. 19, 2014 and titled "Counting Inventory Items Using Image Analysis," which is hereby incorporated by reference in its entirety.

BACKGROUND

Retailers, wholesalers, and other product distributors typically maintain an inventory of various items that may be ordered, purchased, leased, borrowed, rented, viewed, etc., by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

It is often desirable to track inventory items at their location. Some fulfillment centers and/or physical stores may utilize barcodes, radio frequency identifier tags, etc., to track inventory within the facility.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
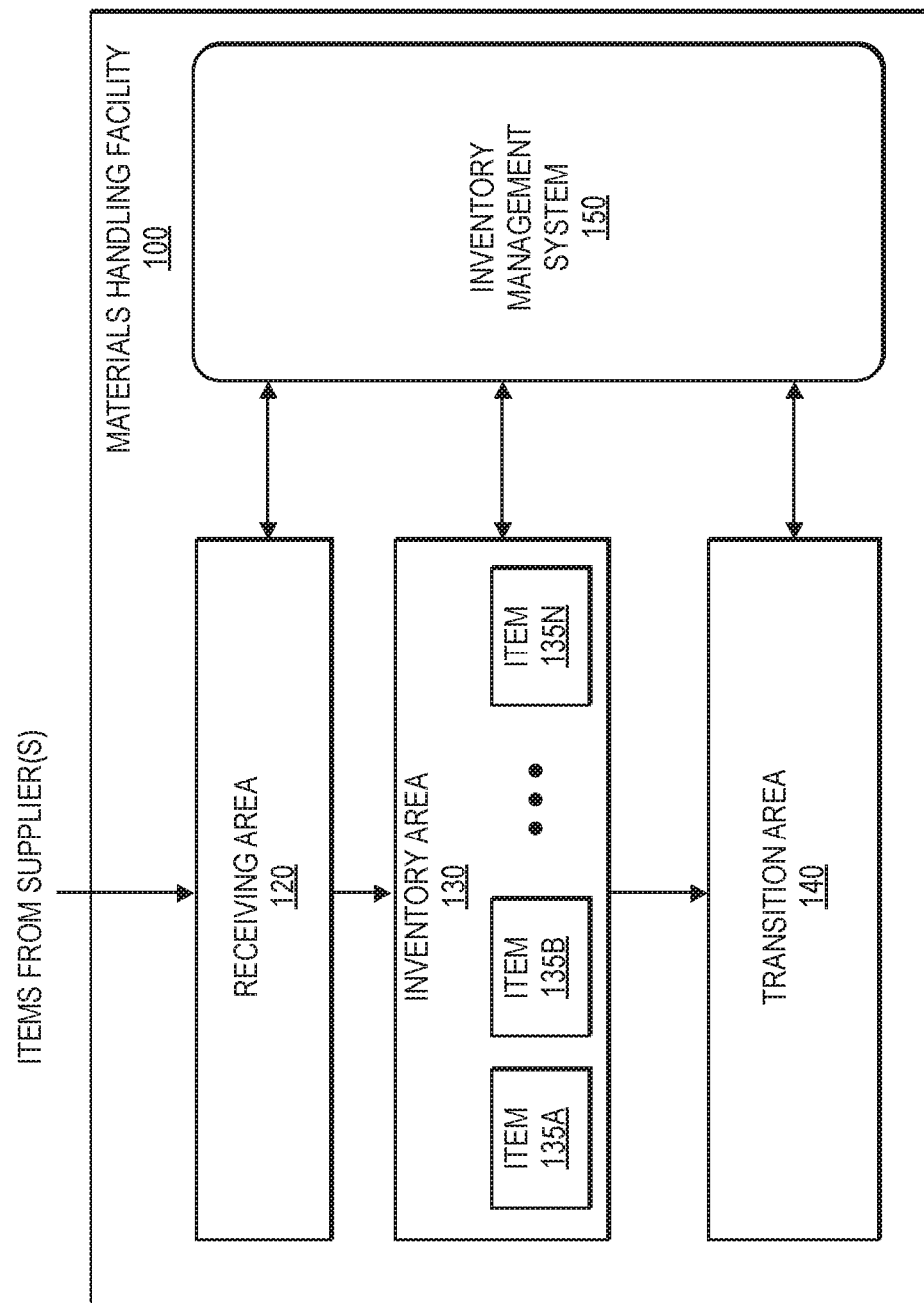
FIG. 1 is a block diagram illustrating a materials handling facility, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (i.e., through an intermediary), physical or wireless, mechanical, chemical, optical, analog, digital, or electrical.

DETAILED DESCRIPTION

This disclosure describes a system for tracking and counting inventory items at inventory locations within a materials handling facility. Cameras are positioned at inventory locations along an inventory shelf and positioned to capture images of items located at that inventory location. Using one or more processing techniques, the images may be processed to determine a count of inventory items at the inventory location. The type of inventory items at each inventory location is known based on stocking information generated when inventory is first placed at the inventory location. Likewise, for each type of inventory item, item information may be maintained, such as the item dimensions (height, width, length), weight, color, shape, etc.

In some implementations, multiple histogram of oriented gradients (HOG) models may be established and associated with the item information for each item type. As discussed below, rather than utilizing a single HOG model for an item type, multiple HOG models may be established and used to detect representations of items in an image. HOG models may be established based on the position, location or orientation of the item with respect to a camera. For example, a first HOG model may be established that is representative of items near the front of a shelf (e.g., near the camera), a second HOG model may be established that is representative of items near the middle of the shelf, and a third HOG model may be established is representative of items near the rear of the shelf. Different HOG models for different shelf positions aid in item detection because the item appears different in the image the farther it is horizontally from the camera that obtains the image. Likewise, HOG models may be generated that are representative of different positions of the item with respect to the camera (e.g., offset of 0 degrees, 30 degrees, 45 degrees, 90 degrees) because items will appear different based on their orientation with respect to the camera. In still other implementations, HOG models may be generated that are representative of items based on how far vertically they are from the camera. For example, different HOG models may be established based on how many items are stacked vertically on a shelf.

When an image of an item at an inventory location is obtained, it may be compared to the multiple HOG models for the item and an item count may be determined based on the HOG model that is determined to correspond to the image.

In another example, the camera may generate depth information representing a distance of the object from the camera. For example, the camera may be a stereo or RGBD camera that determines depth information for each pixel of an obtained image. The depth information may be utilized to generate a point cloud representative of the image with respect to the inventory location (e.g., the shelf of the inventory location). Based on the depth information and the known item information (e.g., height, width, length), a count of the inventory items at the inventory location may be determined.

In some implementations, HOG models and depth information may be combined to count inventory items at an inventory location. For example, one or more HOG models may be utilized to detect items in an image based on features of those items. Depth information corresponding to the image may then be utilized to confirm the orientation of the detected item features and confirm whether the item features represent distinct items or if more than one feature of the same item has been detected and counted as separate items. For example, a HOG model may be established that includes model feature vectors representative of a logo on an item, and/or other features of the item. When an image is captured, feature vectors of the image may be generated using a HOG algorithm and compared to the HOG model feature vectors. If the name appears on both the top and the side of the item, the obtained image may include a representation of an item at the front of the shelf that includes both the front and side of the item. When the feature vectors of the image are compared to the HOG model, both instances of the item name (on the front and top of the item) may be identified as corresponding to the HOG model and the same item may be incorrectly counted twice. Utilizing the depth information, it can be determined that one of the detected item names is positioned on the front of the item (because the depth component corresponding to that portion of the image is changing) and eliminate the duplicate count of the item.

In some implementations, the techniques utilized herein for counting items at an inventory location may be utilized to determine actions (e.g., item pick, item place) at an inventory location and also determine the corresponding number of items involved in the action. For example, a pre-activity image of an inventory location may be obtained and an item count of items at the inventory location determined. At some point, an activity (e.g., user interacting with the inventory location) at the item location may be detected and monitored. When the activity terminates, a post-activity image may be obtained and an item count determined. If the pre-activity item count does not correspond with the post-activity item count, it can be determined that an action (e.g., item pick, item place) has occurred. Specifically, if the post-activity count is higher than the pre-activity count, it is determined that an item place has occurred, and the quantity of placed items is the difference between the post-activity count and the pre-activity count. Similarly, if the post-activity count is less than the pre-activity count, it is determined that the item pick has occurred and the quantity of picked items is the difference between the pre-activity count and the post-activity count.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling.

An implementation of a materials handling facility configured to store and manage inventory items is illustrated in FIG. 1. As shown, a materials handling facility 100 includes a receiving area 120, an inventory area 130 configured to store an arbitrary number of inventory items 135A-135N, and one or more transition areas 140. The arrangement of the various areas within materials handling facility 100 is depicted functionally rather than schematically. For example, in some implementations, multiple different receiving areas 120, inventory areas 130 and transition areas 140 may be interspersed rather than segregated. Additionally, the materials handling facility 100 includes an inventory management system 150 configured to interact with each of receiving area 120, inventory area 130, transition area 140 and/or users within the materials handling facility 100.

The materials handling facility 100 may be configured to receive different kinds of inventory items 135 from various suppliers and to store them until a user orders or retrieves one or more of the items. The general flow of items through the materials handling facility 100 is indicated using arrows. Specifically, as illustrated in this example, items 135 may be received from one or more suppliers, such as manufacturers, distributors, wholesalers, etc., at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135, such as bulk products, commodities, etc., may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within inventory area 130 at an inventory location on an inventory shelf. In some implementations, like items 135 may be stored or displayed together in bins, on shelves or via other suitable storage mechanisms, such that all items 135 of a given kind are stored in one location. In other implementations, like items 135 may be stored in different locations. For example, to optimize retrieval of certain items 135 having high turnover or velocity within a large physical facility, those items 135 may be stored in several different locations to reduce congestion that might occur at a single point of storage.

When a user order specifying one or more items 135 is received, or as a user progresses through the materials handling facility 100, the corresponding items 135 may be selected or "picked" from the inventory area 130. For example, in one implementation, a user may have a list of items to pick and may progress through the materials handling facility picking items 135 from the inventory area 130. In other implementations, materials handling facility employees (referred to herein as users) may pick items 135 using written or electronic pick lists derived from orders. In some instances, an item may need to be repositioned from one location within the inventory area 130 to another location. For example, in some instances, an item may be picked from its inventory area, moved a distance and placed at another location.

Figure 2:
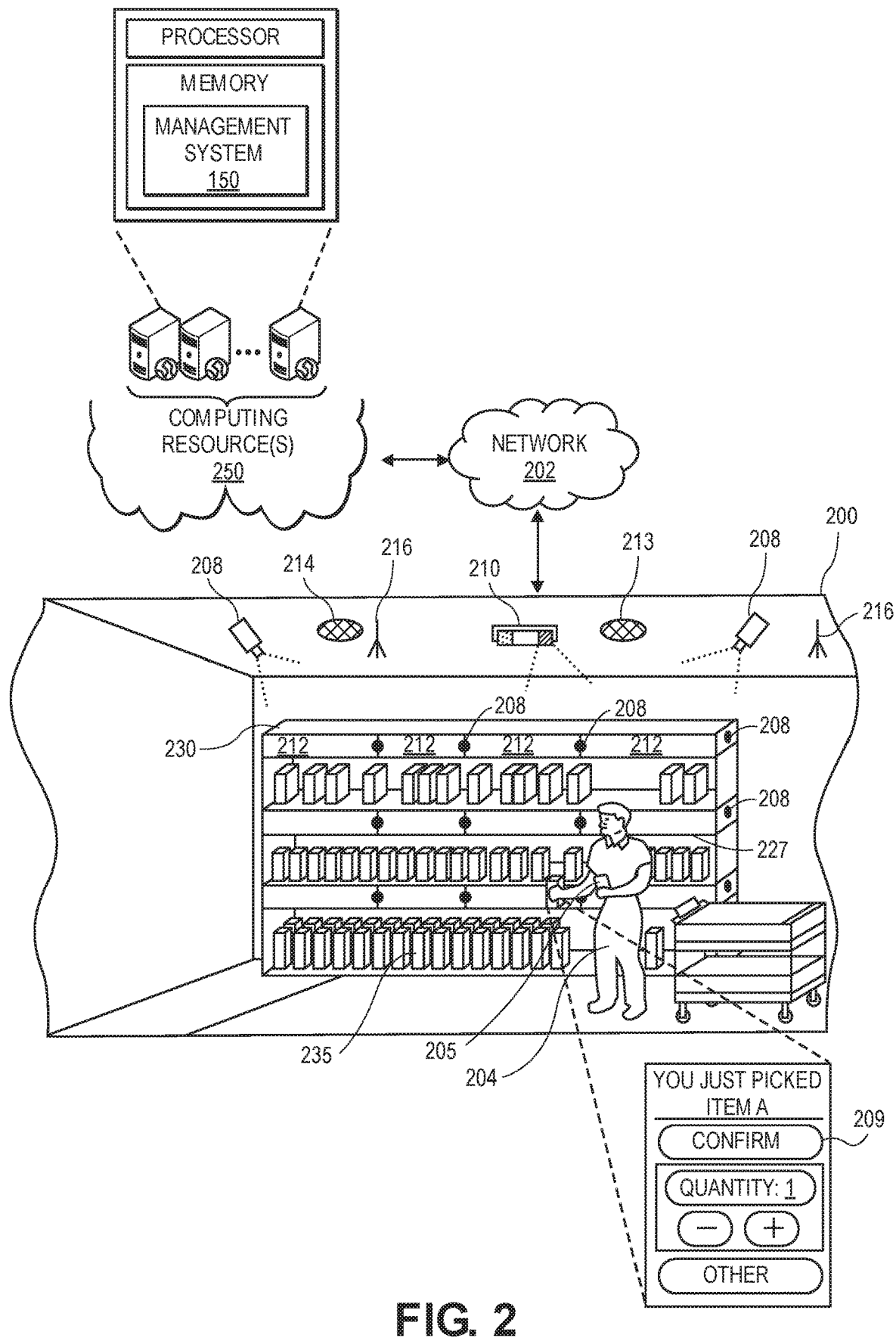
FIG. 2 shows additional components of the materials handling facility of FIG. 1, according to an implementation.

FIG. 2 shows additional components of a materials handling facility 200, according to one implementation. Generally, the materials handling facility 200 may include one or more image capture devices, such as cameras 208. For example, one or more cameras 208 may be positioned in locations of the materials handling facility 200 so that images of locations, items, and/or users within the materials handling facility can be captured. In some implementations, the image capture devices 208 may be positioned overhead, such as on the ceiling, to capture images of users and/or locations within the materials handling facility. In addition, in some implementations, one or more cameras 208 may be positioned on or inside of inventory areas and/or at respective inventory locations within an inventory area. For example, a series of cameras 208 may be positioned on external portions of the inventory areas and positioned to capture images of users and/or the location surrounding the inventory area. Likewise, one or more multiple-camera apparatus 227 may be positioned within the inventory areas and cameras positioned at respective inventory locations to capture images of items stored at inventory location within the inventory area.

Any type of camera and/or configuration of cameras may be used with the implementations described herein. For example, one or more of the cameras may be a red, green, blue ("RGB") color, still cameras, motion capture/video cameras, etc. In other implementations, one or more of the cameras may be depth sensing cameras, RGBD cameras, etc. As discussed further below, in some implementations, cameras may be paired to provide stereo imagery and depth information for items located on inventory shelves within the materials handling facility. In other implementations, the cameras may include depth sensors, such as ultrasonic sensors, laser sensors, radar distance measurement sensors, stadiametric sensors, parallax sensors, Lidar sensors, Sonar sensors, time-of-flight sensors, etc.

In addition to cameras and/or depth sensors, other input devices, such as pressure sensors, scales, light curtains, load cells, radio frequency identification ("RFID") readers, etc., may be utilized with the implementations described herein. For example, a pressure sensor and/or a scale may be used to detect the presence or absence of items and/or to determine when an item is added and/or removed from an inventory location. Likewise, a light curtain may be positioned to cover the front of an inventory location and detect when an object (e.g., a user's hand) passes into or out of the inventory location. The light curtain may also include a reader, such as an RFID reader, that can detect a RFID tag included on an item as the item passes into or out of the inventory location. For example, if the item includes a RFID tag, a RFID reader may detect the RFID tag as the item passes into or out of the inventory location. Alternatively, or an addition thereto, the inventory shelf may include one or more antenna elements coupled to a RFID reader that are configured to read RFID tags of items located on the inventory shelf.

When a user 204 arrives at the materials handling facility 200, one or more images of the user may be captured and processed. For example, the images of the user 204 may be processed to identify the user 204. This may be done using a variety of techniques, such as facial recognition, pattern matching, etc. In some implementations, rather than or in addition to processing images to identify the user 204, other techniques may be utilized to identify the user 204. For example, the user 204 may provide an identification (e.g., user name, password), the user may present an identifier (e.g., identification badge, card), an RFID tag in the possession of the user may be detected, a visual tag (e.g., barcode, bokode, watermark) in the possession of the user may be detected, biometrics may be utilized to identify the user, etc.

The captured images and/or other inputs may also be used to establish a user pattern for the user while located in the materials handling facility 200. The user pattern may identify an overall shape of the user and/or any distinguishing features of the user 204 (e.g., color of shirt, height) that may be used to assist in the identification and/or tracking of the user as they progress through the materials handling facility 200.

In some implementations, a user located in the materials handling facility 200 may possess a portable device 205 and obtain information about items located within the materials handling facility 200, receive confirmation that the inventory management system 150 has correctly identified items that are picked and/or placed by the user, receive requests for confirmation 209 regarding one or more event aspects, etc. Generally, the portable device 205 has at least a wireless module to facilitate communication with the inventory management system 150 and a display (e.g., a touch based display) to facilitate visible presentation to and interaction with the user. The portable device 205 may store a unique identifier and provide that unique identifier to the inventory management system 150 and be used to identify the user 204. In some instances, the portable device may also have other features, such as audio input/output (e.g., speaker(s), microphone(s)), video input/output (camera(s), projector (s)), haptics (e.g., keyboard, keypad, touch screen, joystick, control buttons) and/or other components.

In some instances, the portable device 205 may operate in conjunction with or may otherwise utilize or communicate with one or more components of the inventory management system 150. Likewise, components of the inventory management system 150 may interact and communicate with the portable device as well as identify the user, communicate with the user via other means and/or communicate with other components of the inventory management system 150.

Generally, the inventory management system 150 may include one or more input/output devices, such as imaging devices (e.g., cameras) 208, projectors 210, displays 212, speakers 213, microphones 214, multiple-camera apparatus 227, illumination elements (e.g., lights), etc., to facilitate communication between the inventory management system 150 and/or the user and detection of items, events and/or other actions within the materials handling facility 200. In some implementations, multiple input/output devices may be distributed within the materials handling facility 200. For example, there may be multiple imaging devices, such as cameras located on the ceilings and/or cameras (such as pico-cameras) located in the aisles near the inventory items.

Likewise, the inventory management system 150 may also include one or more communication devices, such as wireless antennas 216, which facilitate wireless communication (e.g., Wi-Fi, Near Field Communication (NFC), Bluetooth) between the inventory management system 150 and other components or devices. The inventory management system 150 may also include one or more computing resource(s) 250, such as a server system, that may be local to the environment (e.g., materials handling facility), remote from the environment, or any combination thereof.

The inventory management system 150 may utilize antennas 216 within the materials handling facility 200 to create a network 202 (e.g., Wi-Fi) so that the components and devices can connect to and communicate with the inventory management system 150. For example, when the user picks an item 235 from an inventory area 230, a camera of the multiple-camera apparatus 227 may detect the removal of the item and the inventory management system 150 may receive information, such as image data of the performed action (item pick from the inventory area), identifying that an item has been picked from the inventory area 230. The event aspects (e.g., user identity, action performed, item involved in the event) may then be determined by the inventory management system 150.

Figure 3:
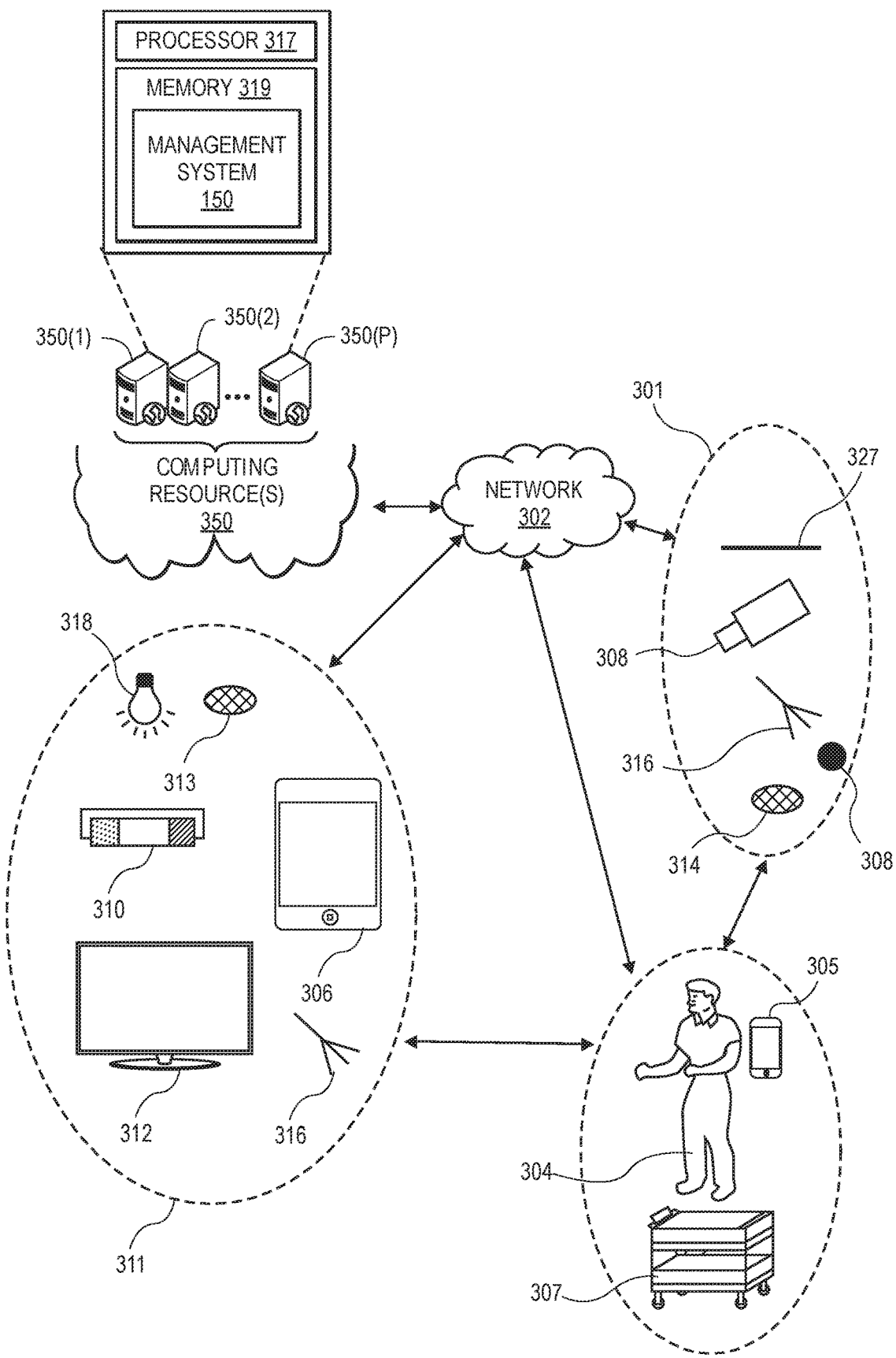
FIG. 3 shows components and communication paths between component types utilized in a materials handling facility of FIG. 1, according to an implementation.

FIG. 3 shows example components and communication paths between component types utilized in a materials handling facility 100, in accordance with one implementation. A portable device 305 may communicate and interact with various components of an inventory management system 150 over a variety of communication paths. Generally, the inventory management system 150 may include input components 301, output components 311 and computing resource(s) 350. The input components 301 may include an imaging device 308, a multiple-camera apparatus 327, microphone 314, antenna 316, or any other component that is capable of receiving input about the surrounding environment and/or from the user 304. The output components 311 may include a projector 310, a portable device 306, a display 312, an antenna 316, a radio (not shown), speakers 313, illumination elements 318 (e.g., lights), and/or any other component that is capable of providing output to the surrounding environment and/or the user 304.

The inventory management system 150 may also include computing resource(s) 350. The computing resource(s) 350 may be local to the environment (e.g., materials handling facility), remote from the environment, or any combination thereof. Likewise, the computing resource(s) 350 may be configured to communicate over a network 302 with input components 301, output components 311 and/or directly with the portable device 305, a user and/or the tote 307.

As illustrated, the computing resource(s) 350 may be remote from the environment and implemented as one or more servers 350(1), 350(2), . . . , 350(P) and may, in some instances, form a portion of a network-accessible computing platform implemented as a computing infrastructure of processors, storage, software, data access, and so forth that is maintained and accessible by components/devices of the inventory management system 150 and/or the portable device 305 via a network 302, such as an intranet (e.g., local area network), the Internet, etc. The server system 350 may process images of users to identify the user, process images of items to identify items, process images of inventory location to determine activity or actions, to count items at an inventory location, determine a location of items and/or determine a position of items. The server system(s) 350 does not require end-user knowledge of the physical location and configuration of the system that delivers the services. Common expressions associated for these remote computing resource(s) 350 include "on-demand computing," "software as a service (SaaS)," "platform computing," "network-accessible platform," "cloud services," "data centers," and so forth.

Each of the servers 350(1)-(P) include a processor 317 and memory 319, which may store or otherwise have access to an inventory management system 150, which may include or provide image processing (e.g., for user identification, item counting, and/or item identification), inventory tracking, and/or location determination.

The network 302 may utilize wired technologies (e.g., wires, universal serial bus ("USB"), fiber optic cable, etc.), wireless technologies (e.g., radio frequency, infrared, NFC, cellular, satellite, Bluetooth, etc.), or other connection technologies. The network 302 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Figure 4:
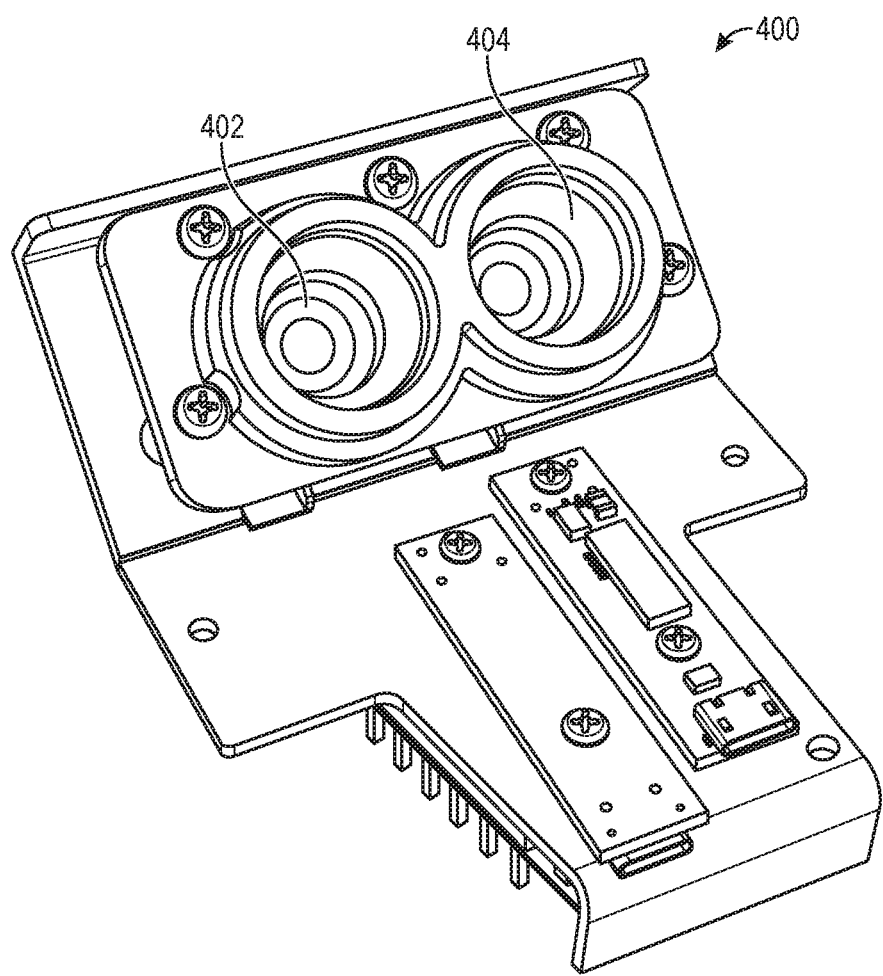
FIG. 4 is an illustration of a camera pair, according to one implementation.

FIG. 4 is an illustration of a camera pair 400, according to one implementation. The camera pair 400 may be formed as a single unit, as illustrated, and/or incorporated onto a mounting surface (not shown), such as a board or an inventory shelf, with other camera pairs 400. The cameras 402, 404 of the camera pair 400 are set at a fixed distance with respect to one another so that images obtained from each camera may be analyzed together to generate a depth map of the item(s) represented in the obtained images. For example, the cameras 402, 404 may be spaced approximately 6.35 centimeters apart.

By joining two individual cameras into a single camera pair 400, as illustrated, the lens may be securely mounted at fixed, known distances from one another so that image processing and depth maps can be accurately generated. Likewise, the cost of fabrication can be reduced through the common use of components. In some implementations, the camera pair 400 may also include an illumination element (light) that is used to illuminate an object that is to be recorded in an image.

Figure 5:
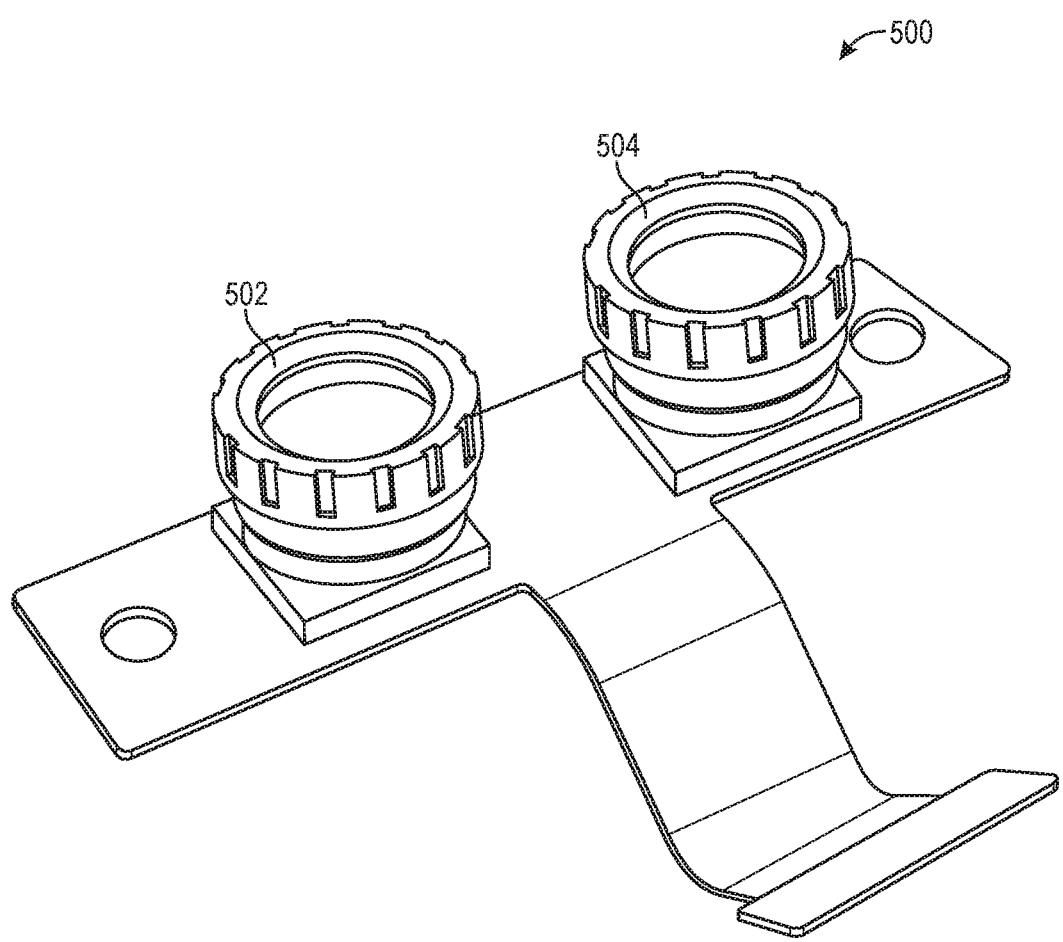
FIG. 5 is another illustration of a camera pair, according to one implementation.

FIG. 5 is another illustration of a camera pair 500, according to one implementation. The camera pair 500 may be formed as a single unit, as illustrated, and/or incorporated onto a mounting surface (not shown), such as a board or an inventory shelf, with other camera pairs 500. The cameras 502, 504 of the camera pair 500 are set at a fixed distance with respect to one another so that images obtained from each camera may be analyzed together to generate a depth map of the item(s) represented in the obtained images. For example, the cameras 502, 504 may be spaced approximately 6.35 centimeters apart.

By joining two individual cameras into a single camera pair 500, as illustrated, the cameras may be securely mounted at fixed, known distances from one another so that image processing and depth maps can be accurately generated. Likewise, the cost of fabrication can be reduced through the common use of components. As discussed further below with respect to FIGS. 6 and 7, the camera pair 500 is a simplified version of the camera pair 400 in which many of the device components have been consolidated or removed.

Figure 6:
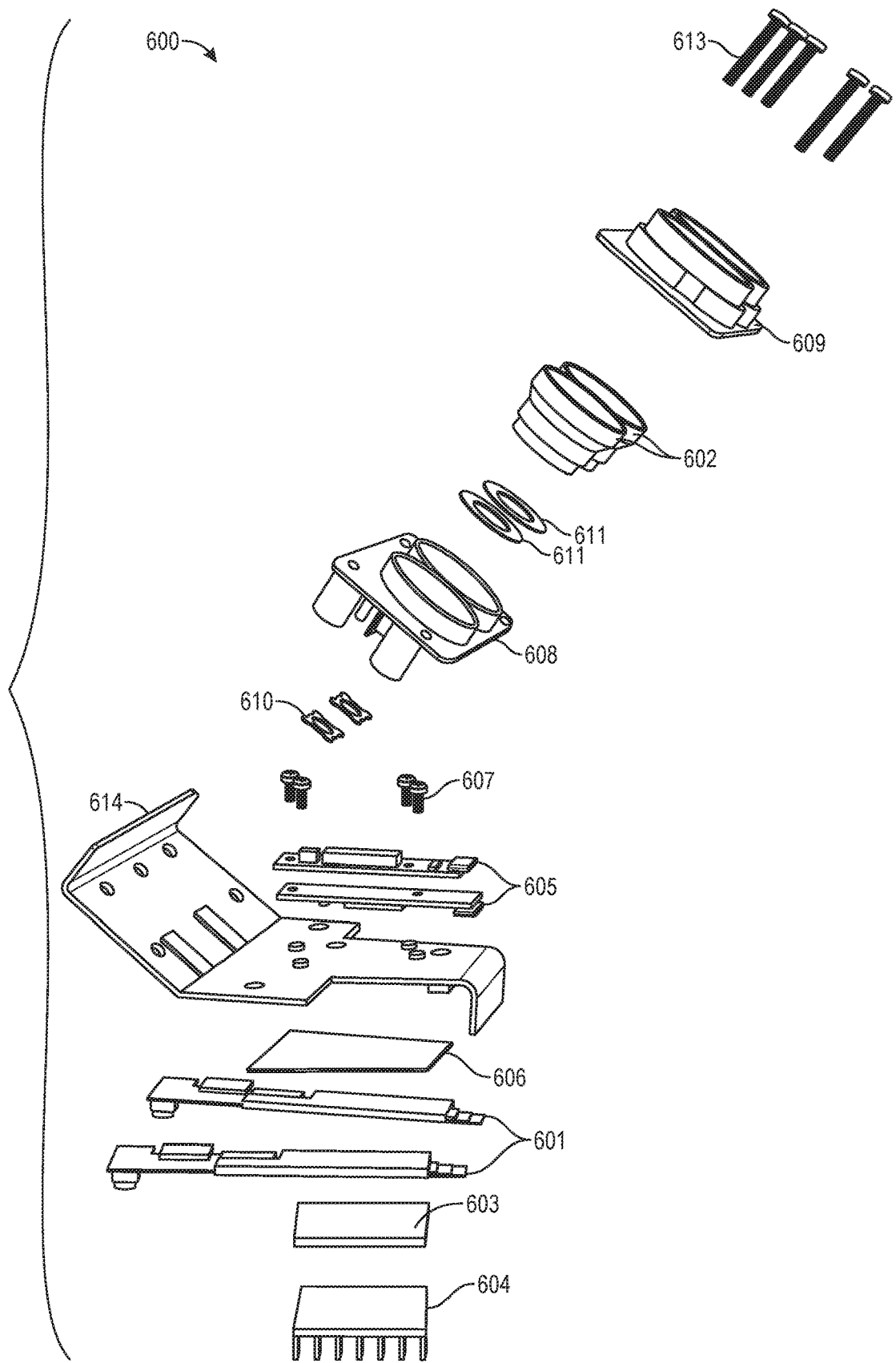
FIG. 6 is an illustration of component view of a camera pair, according to one implementation.

FIG. 6 is an illustration of a component view of a camera pair 600, according to one implementation. The camera pair 600 provides a component view of the camera pair 400 (FIG. 4). The camera pair 600 may include a pair of camera modules 601. As illustrated, each lens 602 of the camera pair 600 may include its own camera module 601. Each camera module 601 may include an image sensor to convert an optical image obtained by the lens of the camera 602 into a digital signal or digital representation of the image (generally referred to herein as image data). In one implementation, each image sensor may be a RGB color sensor capable of supporting an image resolution of at least 860×480 at six frames per second (fps). Likewise, the image data may be stored in any variety of formats including, but not limited to YUYV, RGB, RAW, bmp, jpeg, etc. The camera module 601 may also include memory for buffering or storing image data.

Each camera module 601 may be thermally coupled to a heat sink 604 using a thermally conductive material 603, such as thermal tape, thermal gel, thermal grease, thermal compound, thermal paste, heat paste, heat sink paste, heat transfer compound, heat transfer paste (HTP), heat sink compound, etc. The thermally conductive material improves thermal transfer between the camera modules 601 and the heat sink 604. The thermally conductive material may comprise a ceramic, metal, carbon, graphite, liquid metal, phase change metal alloy (PCMA) and other similar materials. The heat sink 604 is positioned to dissipate heat away from the camera pair 600.

In some implementations, the camera modules 601 may also be affixed to the frame 614 of the camera pair 600 using a thermally conductive material 606, either alone or in conjunction with other mounting hardware (e.g., screws). Similar to the thermally conductive material 603, the thermally conductive material 606 improves the thermal transfer between the camera modules 601 and the frame 614. In such an implementation, the frame 614, which may also be formed of a thermally conductive material, may likewise be used as a heat sink to aid in the dissipation of heat away from the camera modules 601.

The frame 614 may be formed of any suitably rigid material such as graphite, carbon fiber, aluminum, sheet metal, steel, plastic, etc., or any combination thereof. The frame 614 provides a rigid surface to which components of the camera pair 600 may be mounted. Likewise, the frame 614 may be used to mount or otherwise secure the camera pair 600 to a mounting surface, such as an inventory shelf, mounting board, or any other surface.

Each camera 602 of the camera pair 600 may also include an input/output interface 605 for facilitating data exchange. The input/output interface 605 may utilize any interface standard for facilitating data exchange. For example, the input/output interface may utilize a USB standard, such as USB 2.0 or USB 3.0. Alternatively, the input/output interface 605 may utilize the MIPI interface. The input/output interface 605 may be, as illustrated, a printed circuit board that includes a connector for physically connecting the cameras 602 of the camera pair 600 with other components, such as a graphics processing unit, CIC, computing system, etc. Likewise, power and/or instructions for controlling the cameras 602 of the camera pair may be received via the input/output interface 605. Each input/output interface 605 may be affixed to the frame 614. For example, each input/output interface may be mounted to the frame 614 using screws 607.

The cameras 602 may be secured to the camera pair 600 using a camera mount that includes a bottom mount 608 and a top mount 609. The camera mounts may be fabricated so that when the lenses 602 are mounted to form the camera pair 600 they are positioned at defined angles and distances with respect to each other. For example, the camera mounts 608, 609 may be fabricated so that a center point of the lenses 602 are approximately 6.35 centimeters apart from one another. By mounting the cameras 602 at a defined position with respect to one another, processing of the images may be done to generate a depth map that identifies distances between a center point of the camera pair 600 and the object(s) represented in the images.

The cameras 602 may be secured between the top mount 609 and the bottom mount 608 using screw 613 or types of fasteners. Likewise, the screws 613 may be utilized to secure the camera mounts 608, 609 to the frame 614. In some implementations foam pads 610, 611 may be utilized to reduce vibrations and further secure the lenses.

While the examples discussed herein describe the use of a pair of cameras 602 to generate a camera pair 600 to facilitate depth of field sensing, it will be appreciated that paired cameras are not required with the implementations discussed herein. For example, rather than using paired cameras, a camera with one or more lenses may be coupled with a light pattern generator (e.g., infrared light, visible light) that may be utilized to determine a depth map. Other distance determining elements (e.g., range finger, laser, sonar) may likewise be used to determine depth information. In still other implementations, depth information may not be utilized and received image data may be processed to determine items represented in the images, without regard to depth information. In some example, the camera pair may be a standard stereo camera, rather than two lenses paired together to form the camera pair.

Figure 7:
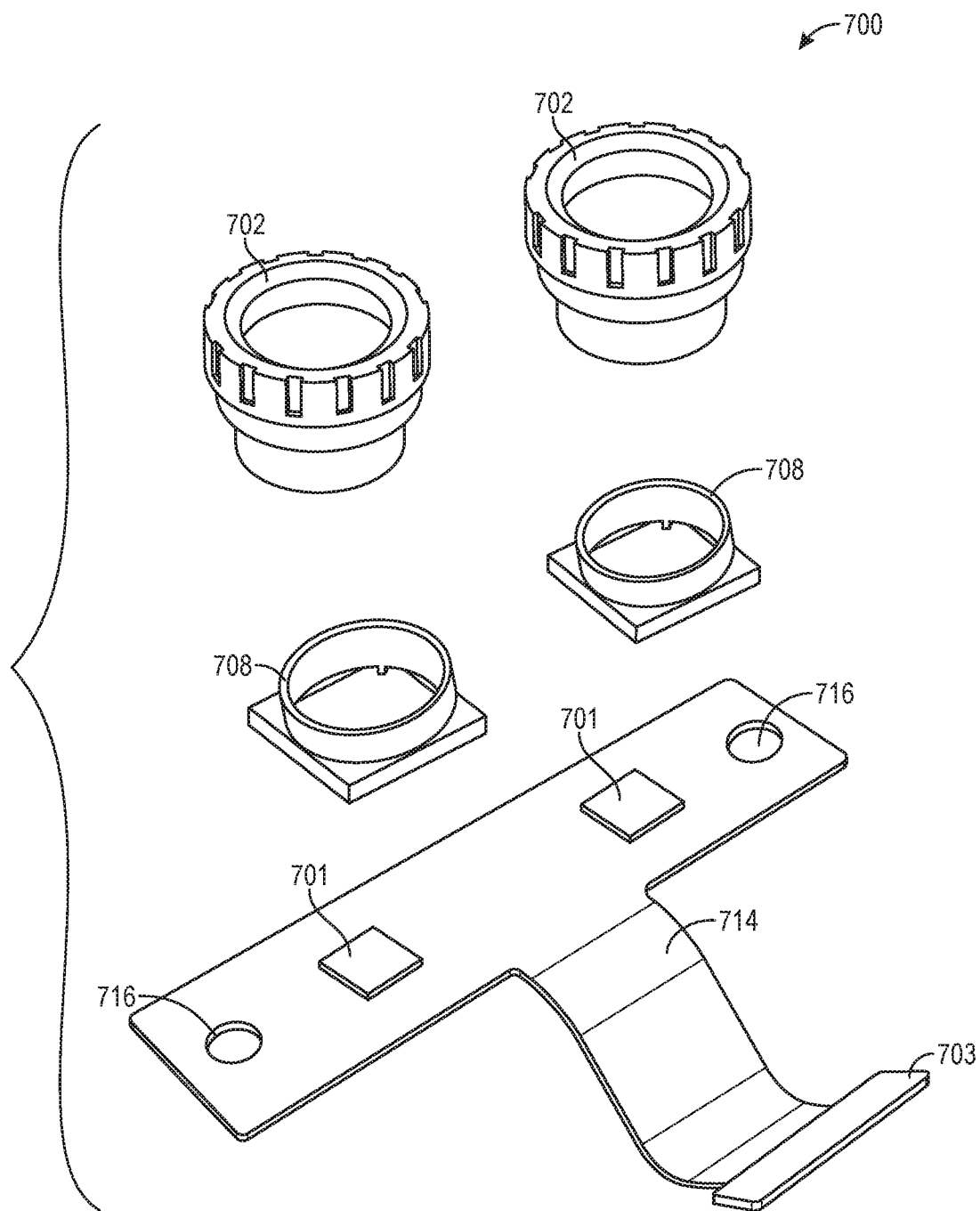
FIG. 7 is another illustration of component view of a camera pair, according to one implementation.

FIG. 7 is an illustration of a component view of a camera pair 700, according to one implementation. The camera pair 700 provides a component view of the camera pair 500 (FIG. 5). As mentioned above, many of the components of the camera pair 700, compared to camera pair 600, have been removed or simplified.

As illustrated, each camera 702 of the camera pair 700 may include its own image sensor 701 to convert an optical image obtained by the lens of the camera 702 into a digital signal or digital representation of the image (generally referred to herein as image data). In contrast to camera pair 600, in which the sensors were incorporated into separate camera modules 601, the sensors 701 of the camera pair 700 may be incorporated directly onto the frame 714. As discussed below, the frame 714 may be a flexible circuit board.

In one implementation, each image sensor 701 may be a RGB color sensor capable of supporting an image resolution of at least 860×480 at six frames per second (fps). Because the implementation of the camera pair 700 does not perform processing on the camera pair 700, there is no need to heat sink as the heat generated from the lenses and sensors is minimal.

In this implementation, the frame 714 may be a flexible circuit to allow direct connection of the image sensors 701 and cameras 702. The frame may include one or more mount points 716 so that the frame can be mounted to other surfaces, such as the underneath side of an inventory shelf. The frame 714 may also include a stiffener 703 that includes a board to board connection, such as a thirty-pin connection, so that the frame 714 can be coupled to a multiple camera apparatus, such as the multiple camera apparatus discussed below, and/or other components, such as a graphics processing unit, CIC, computing system, memory, etc. Likewise, power and/or instructions for controlling the cameras 702 of the camera pair 700 may be received via the board to board connector.

The cameras 702 may be secured to the camera pair 700 using a camera housing 708. The camera housing 708 may be mounted to the frame 714 at defined angles and distances with respect to each other. For example, the camera housings 708 may be mounted to the frame 714 so that a center point of the cameras 702 are approximately 6.35 centimeters apart from one another. By mounting the cameras 702 at a defined position with respect to one another, processing of the images may be done to generate a depth map that identifies distances between a center point of the camera pair 700 and the object(s) represented in the images. The cameras 702 may be screwed into and/or friction fit into the cameras housings 708.

While the examples discussed herein describe the use of a pair of cameras to generate a camera pair 700 to facilitate depth of field sensing, it will be appreciated that paired cameras are not required with the implementations discussed herein. For example, rather than using paired cameras, a camera with one or more lenses may be coupled with a light pattern generator (e.g., infrared light, visible light) that may be utilized to determine a depth map. Other distance determining elements (e.g., range finger, laser, sonar) may likewise be used to determine depth information. In still other implementations, depth information may not be utilized and received image data may be processed to determine items represented in the images, without regard to depth information. In some example, the camera pair may be a standard stereo camera, rather than two cameras paired together to form the camera pair.

With the implementations discussed herein, one the camera pair 600, 700 is mounted at a location, the cameras may be calibrated and aligned with each other and the location. For example, if the camera pair 600, 700 is mounted to an underneath side of an inventory shelf and oriented to capture images of the shelf below, a marker or other identifier may be placed on the shelf in a field of view of both cameras of the camera pair 600, 700. Utilizing the marker, the cameras may be adjusted with respect to one another so that the pixel information for the marker is aligned and known for each camera.

Figure 8:
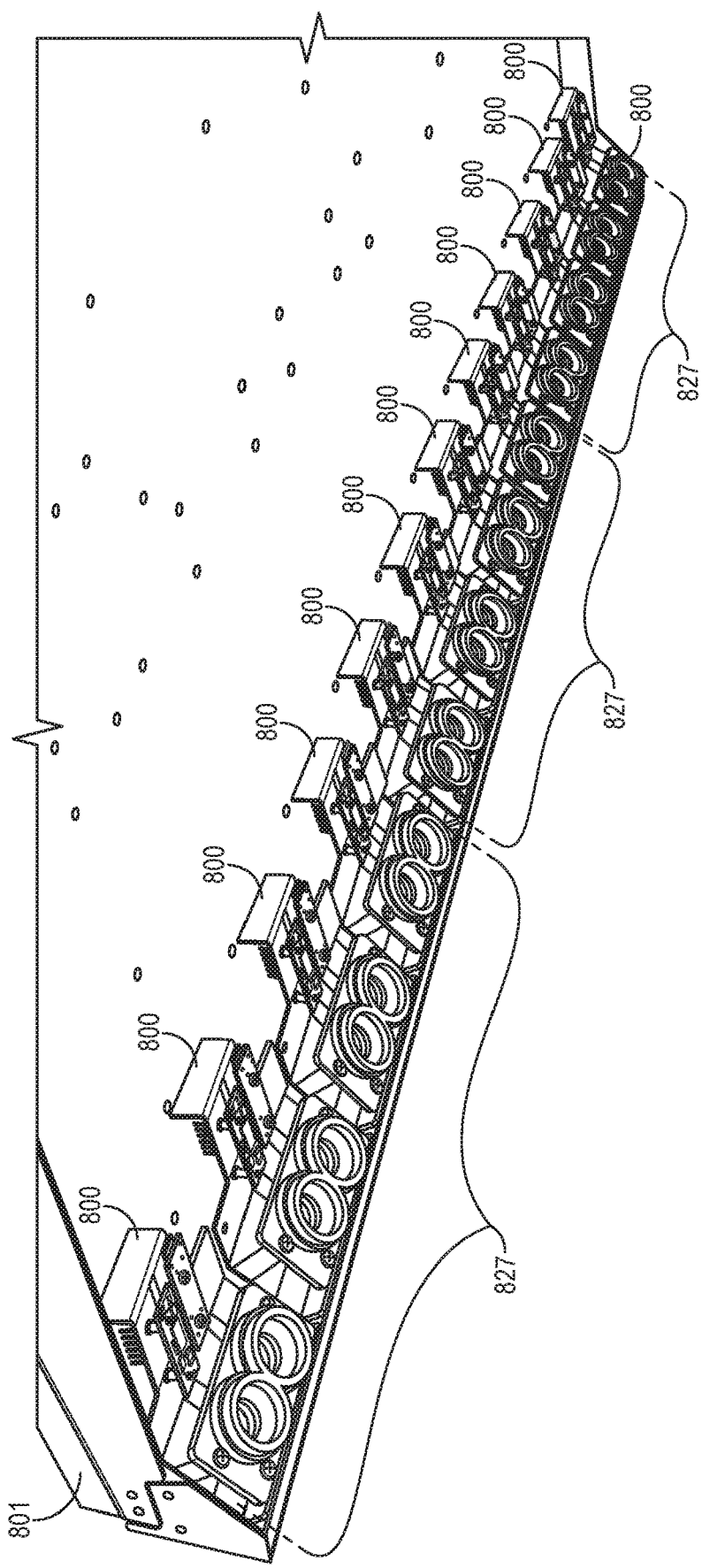
FIG. 8 is an illustration of three multiple-camera apparatus mounted to an underneath side of an inventory shelf, according to one implementation.

FIG. 8 is an illustration of three multiple-camera apparatus 827 mounted to an underneath side of an inventory shelf 801 along the front edge of the inventory shelf, according to one implementation. The illustration in FIG. 8 shows a configuration in which the camera pairs 400 (FIG. 4) are utilized. Each multiple-camera apparatus 827 may be configured as a single mounting surface (not show) to which each of the camera pairs 800 are mounted. The mounting surface, as discussed further below, may also include one or more graphics processing units, CICs and/or other components for processing, storing and/or routing image data generated by the camera pairs 800. Alternatively, each camera pair 800 may be mounted directly to the underneath side of the inventory shelf 801 and communicatively coupled to a corresponding mounting surface, graphics processing unit(s), CICs, etc. through the input/output interfaces 605 (FIG. 6) of the camera pair 800. As will be appreciated, multiple different configurations of a multiple-camera apparatus may be envisioned with different components included on a mounting surface, directly as part of the camera pair 800, separately mounted to the inventory shelf, etc. For example, in one implementation, the inventory shelf 801 may operate as the mounting surface and all components of the multiple-camera apparatus may be mounted to the inventory shelf 801.

In some implementations, a protective shield or protective barrier may be positioned in front of the camera pairs 800 to protect them from external forces, including humidity, inventory items, and/or users. Likewise, a heating element may also be included in the multiple-camera apparatus and/or the cameras may be sealed behind the protective shield to aid in the reduction of humidity due to temperate changes (e.g., the opening of a door to a refrigerated inventory area). In some implementations, the camera pairs 800 may be mounted to the underneath side of the inventory shelf 801 at defined positions. In other implementations, the camera pairs 800 may be mounted to the underneath side of the inventory shelf 801 such that they can be horizontally adjusted. Likewise, the angle of the lenses of the camera pairs 800 may be fixed or adjustable.

In one implementation, the camera pairs 800 may be positioned at defined distances with respect to other camera pairs 800 so that each camera pair 800 is approximately a same distance from adjacent camera pairs 800. For example, the camera pairs 800 may each be horizontally separated by approximately two inches. The separation between the camera pairs 800 may be determined based on the field of view of the camera pairs 800 and/or the spacing between rows of items on the inventory shelf. For example, it may be desirable to separate the camera pairs 800 so that the field of view of each camera pair 800 overlaps the field of view of adjacent camera pairs 800 so there are no locations on the inventory shelf that are not covered by the field of view of at least one camera pair 800. Likewise, if each row of inventory items is spaced a defined distance apart, the camera pair 800 may be similarly spaced so that the field of view of each camera pair 800 corresponds with a row of items.

For example, referring back to FIG. 2, the inventory items 235 are each approximately equally spaced horizontally along the inventory shelf 203. In such an implementation, the camera pairs of each of the multiple-camera apparatus 227 mounted to the underneath side of the inventory shelf 201 may be similarly spaced so that each camera pair is approximately in-line with a row of inventory items 235. As mentioned above, the spacing of the rows of inventory items 235 may be defined for a first inventory shelf 203 and the camera pairs of the multiple-camera apparatus may be mounted in a fixed position on the underneath side of a second inventory shelf 201 that is above the first inventory shelf, so that they are similarity spaced. Alternatively, the camera pairs may be horizontally adjustable along the length of the inventory shelf 201 so that if the configuration or distance between rows of inventory items changes, the camera pairs may be horizontally adjusted so they remain in-line with a row of an inventory item.

Figure 9:
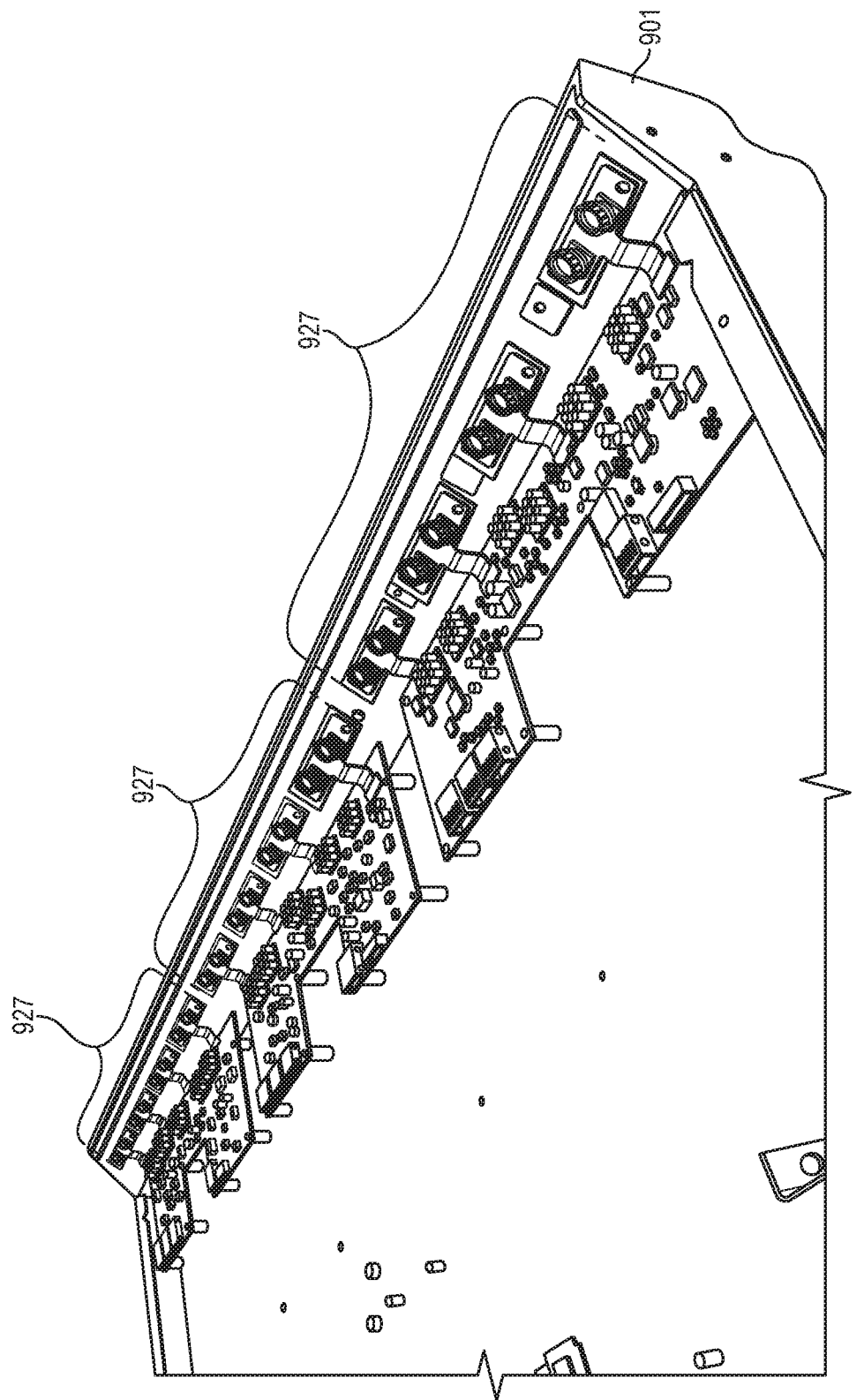
FIG. 9 is another illustration of three multiple-camera apparatus mounted to an underneath side of an inventory shelf, according to one implementation.

FIG. 9 is an illustration of three multiple-camera apparatus 927 mounted to an underneath side of an inventory shelf 901 along the front edge of the inventory shelf, according to one implementation. The illustration in FIG. 9 shows a configuration in which the camera pairs 500 (FIG. 5) are utilized. Each multiple-camera apparatus 927 may be configured as a single mounting surface (not show) to which each of the camera pairs 900 are mounted or coupled. The mounting surface, as discussed further below, may also include one or more graphics processing units, CICs and/or other components for processing, storing and/or routing image data generated by the camera pairs 900. Alternatively, each camera pair 900 may be mounted directly to the underneath side of the inventory shelf 901 and communicatively coupled to a corresponding mounting surface, graphics processing unit(s), CICs, etc. through a board to board connector of the camera pair 900. As will be appreciated, multiple different configurations of a multiple-camera apparatus may be envisioned with different components included on a mounting surface, directly as part of the camera pair 900, separately mounted to the inventory shelf, etc. For example, in one implementation, the inventory shelf 901 may operate as the mounting surface and all components of the multiple-camera apparatus may be mounted to the inventory shelf 901.

In some implementations, a protective shield or protective barrier may be positioned in front of the camera pairs 900 to protect them from external forces, including humidity, inventory items, and/or users. Likewise, a heating element may also be included in the multiple-camera apparatus and/or the cameras may be sealed behind the protective shield to aid in the reduction of humidity due to temperate changes (e.g., the opening of a door to a refrigerated inventory area). In some implementations, the camera pairs 900 may be mounted to the underneath side of the inventory shelf 901 at defined positions. In other implementations, the camera pairs 900 may be mounted to the underneath side of the inventory shelf 901 such that they can be horizontally adjusted. Likewise, the angle of the lenses of the camera pairs 900 may be fixed or adjustable.

In one implementation, the camera pairs 900 may be positioned at defined distances with respect to other camera pairs 900 so that each camera pair 900 is approximately a same distance from adjacent camera pairs 900. For example, the camera pairs 900 may each be horizontally separated by approximately two inches. The separation between the camera pairs 900 may be determined based on the field of view of the camera pairs 900 and/or the spacing between rows of items on the inventory shelf. For example, it may be desirable to separate the camera pairs 900 so that the field of view of each camera pair 900 overlaps the field of view of adjacent camera pairs 900 so there are no locations on the inventory shelf that are not covered by the field of view of at least one camera pair 900. Likewise, if each row of inventory items is spaced a defined distance apart, the camera pair 900 may be similarly spaced so that the field of view of each camera pair 900 corresponds with a row of items.

Figure 10:
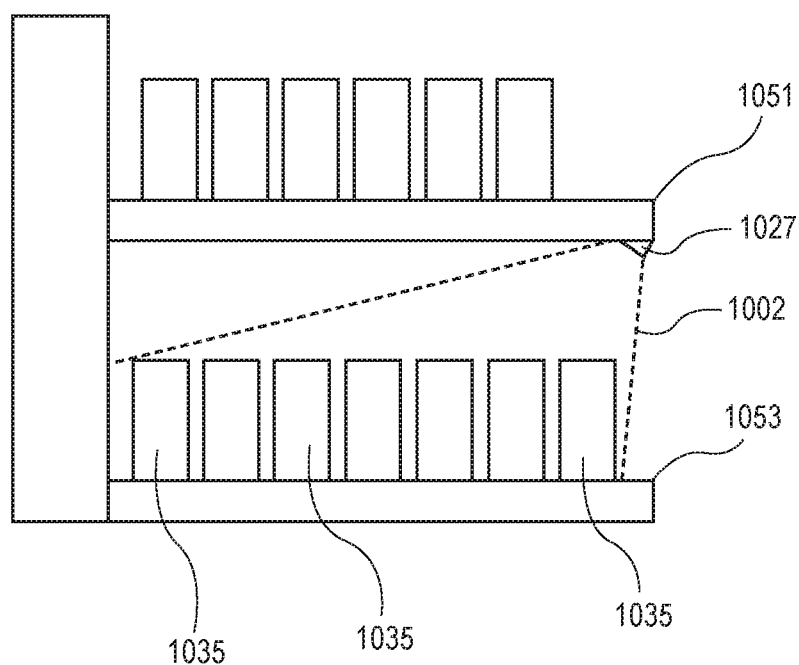
FIG. 10 is a block diagram of a side view of an inventory location, according to one implementation.

Referring now to FIG. 10, illustrated is a side view of two inventory shelves 1051, 1053, according to an implementation. One or more of the inventory shelves 1051, 1053 may support inventory items 1035 on a top side of the inventory shelf 1051, 1053. The inventory items may be arranged in rows extending from the back or rear of the top side of the inventory shelf to the front of the top side of the inventory shelf. One or more multiple-camera apparatus 1027 may be mounted to an underneath side of the inventory shelf 1051, 1053 and oriented so that the field of view of each camera is directed toward the top side of the inventory shelf below the inventory shelf to which the multiple-camera apparatus is mounted. For example, the multiple-camera apparatus 1027 is mounted to the underneath side of the upper inventory shelf 1051 and each of the camera pairs are positioned so that the field of view 1052 of the camera pairs are directed to the top side of the lower inventory shelf 1053, upon which inventory items 1035 are positioned.

In one implementation, the inventory shelves may be positioned so that the top of the inventory items 1035 are at least a defined distance from the camera pairs of the multiple-camera apparatus. For example, the inventory shelves 1051, 1053 may be positioned so that there is at least a two inch separation between the bottom of each camera pair of the multiple-camera apparatus 1027 and the top of the inventory items 1035.

By separating the top of the inventory items 1035 and the camera pairs by at least a defined distance, there is enough distance so that the camera pairs can focus on the inventory items 1035, the inventory items can be picked from the inventory shelf or placed into the inventory shelf without contacting the multiple-camera apparatus and so that more than one item in a row of inventory items is viewable by the camera pair. As illustrated by the field-of-view 1002 in FIG. 10, is some implementations, the lenses of the camera pair 800 may be wide angle lenses having a large field-of-view (e.g., greater than 80 degrees) and the camera pairs 800 may be positioned so that the field of view extends from the front of the inventory shelf 1053 to the back or rear of the inventory shelf. In such an implementation, at least a portion of each item in the row of inventory items may be viewable by at least one camera pair of a multiple-camera apparatus.

While the implementations discussed herein illustrate the use of two wide angle lenses in a paired configuration to enable viewing of items located on the shelf, in other implementations, additional cameras positioned at other locations on the underneath side of the shelf and/or multiple-camera apparatus positioned at different locations on the shelf may be utilized. For example, rather than having multiple-camera-apparatus only mounted to the underneath side of the inventory shelf and along the front edge, in some implementations, cameras may also be positioned along the rear of the underneath side of the inventory shelf facing toward the front of a lower inventory shelf to obtain images of items toward the rear of the shelf. In still another example, one or more cameras may be positioned near the cameras of the multiple-camera apparatus and oriented so that the field of view of the camera is directed toward the rear of the inventory shelf.

Figure 11:
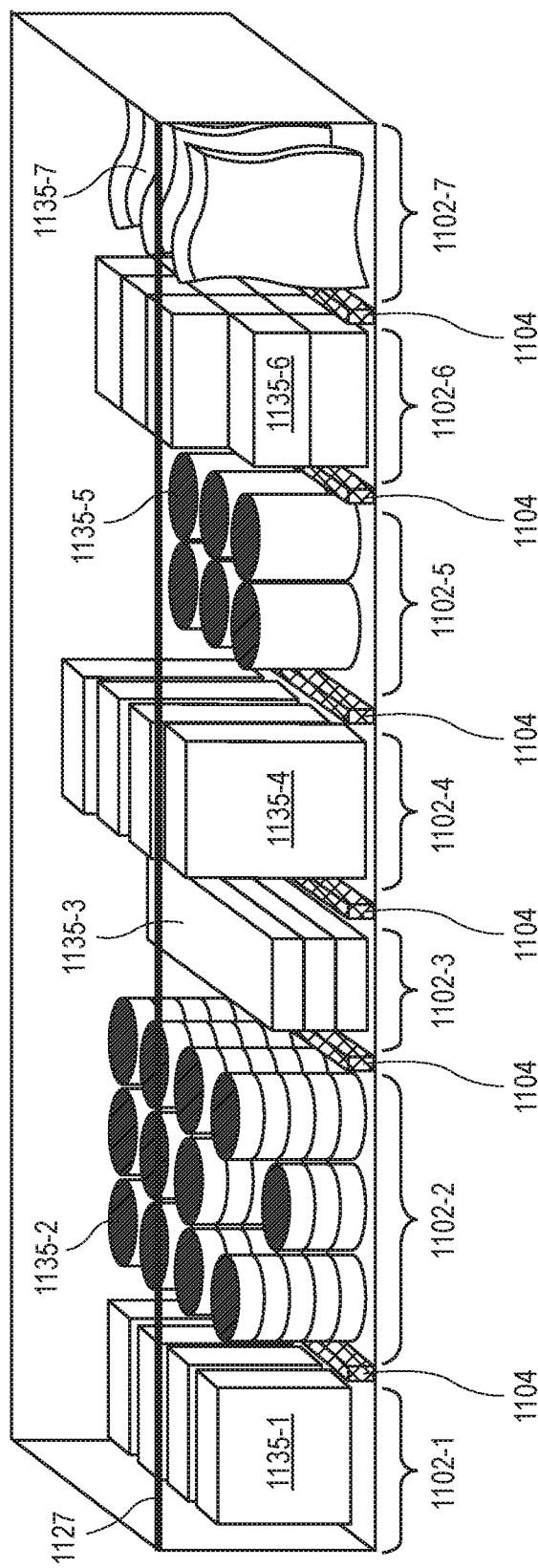
FIG. 11 is a block diagram of a front view of an inventory shelf, according to an implementation.

FIG. 11 is a block diagram of a front view of an inventory shelf 1151, according to an implementation. In this illustration, the upper shelf to which the multiple camera apparatus 1127 may be coupled, has been removed to facilitate discussion. The inventory shelf 1151 includes items 1135 positioned at defined inventory locations 1102. In this example, each inventory location is separated by a physical divider 1104. As discussed below, the physical dividers 1104 may provide a marker or identifier for camera alignment and/or to determine boundaries between inventory locations when processing images of items.

In this example, the cameras of each multiple-camera apparatus 1127 are mounted to the underneath side of the inventory shelf above the inventory shelf 1151 and aligned with each of the inventory locations 1102 so that the field of view of each camera includes the inventory items 1135 located at the inventory location 1102. As illustrated, inventory items 1135 within a materials handling facility may vary in size, shape, placement, color, etc. For example, inventory items 1135-1 located at inventory location 1102-1 have a width and a height that is more than their depth so they are positioned in a horizontally stacked configuration. With the distance between the top of the items 1135-1 and the multiple-camera apparatus 1127, the multiple camera apparatus is able to obtain an image that includes at least a portion of each item 1135-1 in the inventory location 1102-1. For example, a captured image would include the top and front of the first item and the top of each other item in the inventory location 1102-1.

The inventory items 1135-2 are smaller in shape and cylindrical. Due to their size and configuration they may be stacked vertically, horizontally and/or laterally in the inventory location 1102-2. By setting the maximum stack height to a defined value (e.g., 2 inches below the multiple-camera apparatus 1127), an image obtained by the camera of the multiple-camera apparatus 1127 that is aligned with the inventory location 1102-2 will include a representation of at least a top of each vertical stack of items 1135-2.

Inventory items 1135-3 located at inventory location 1102-3 have a width and a height that is less than their depth so they are positioned in a vertically stacked configuration. Because of the configuration of the items, an image obtained by the multiple camera apparatus 1127 may only include a representation of the item 1102-3 on top of the stack. Alternatively, the image may include the top of the top item on the vertical stack and possibly a portion of each front side of the items in the vertical stack.

Inventory items 1135-4 located at inventory location 1102-4 are similar to inventory items 1135-1, but may be taller such that an image obtained by the camera of the multiple-camera apparatus may only include a representation of the item 1135-4 at the front of the horizontal stack configuration.

Inventory items 1135-5 located at inventory location 1102-5 are multi-items that are treated as a single inventory item. In this example, six individual cylindrical items are joined and treated as a single inventory item 1135-5. The camera of the multi-camera apparatus 1127 aligned with the inventory location 1102-5 may obtain an image that includes all of the individual items. As discussed in further detail below, the implementations described herein may be configured to detect the group of items and treat them as a single inventory item for counting.

The inventory items 1135-6 are rectangular shaped. Due to their size and shape, they may be stacked both vertically and horizontally in the inventory location 1102-6. By setting the maximum stack height to a defined value (e.g., 2 inches below the multiple-camera apparatus 1127), an image obtained by the camera of the multiple-camera apparatus 1127 that is aligned with the inventory location 1102-6 will include a representation of at least a top of each stack of items 1135-6.

The inventory items 1135-7 are bags that may vary or alter in shape. In this configuration, the bags of items 1135-7 may be stacked horizontally, but varying amounts of each item may be visible to the camera of the multiple-camera apparatus 1127 aligned with the inventory location 1102-7.

Figure 19:
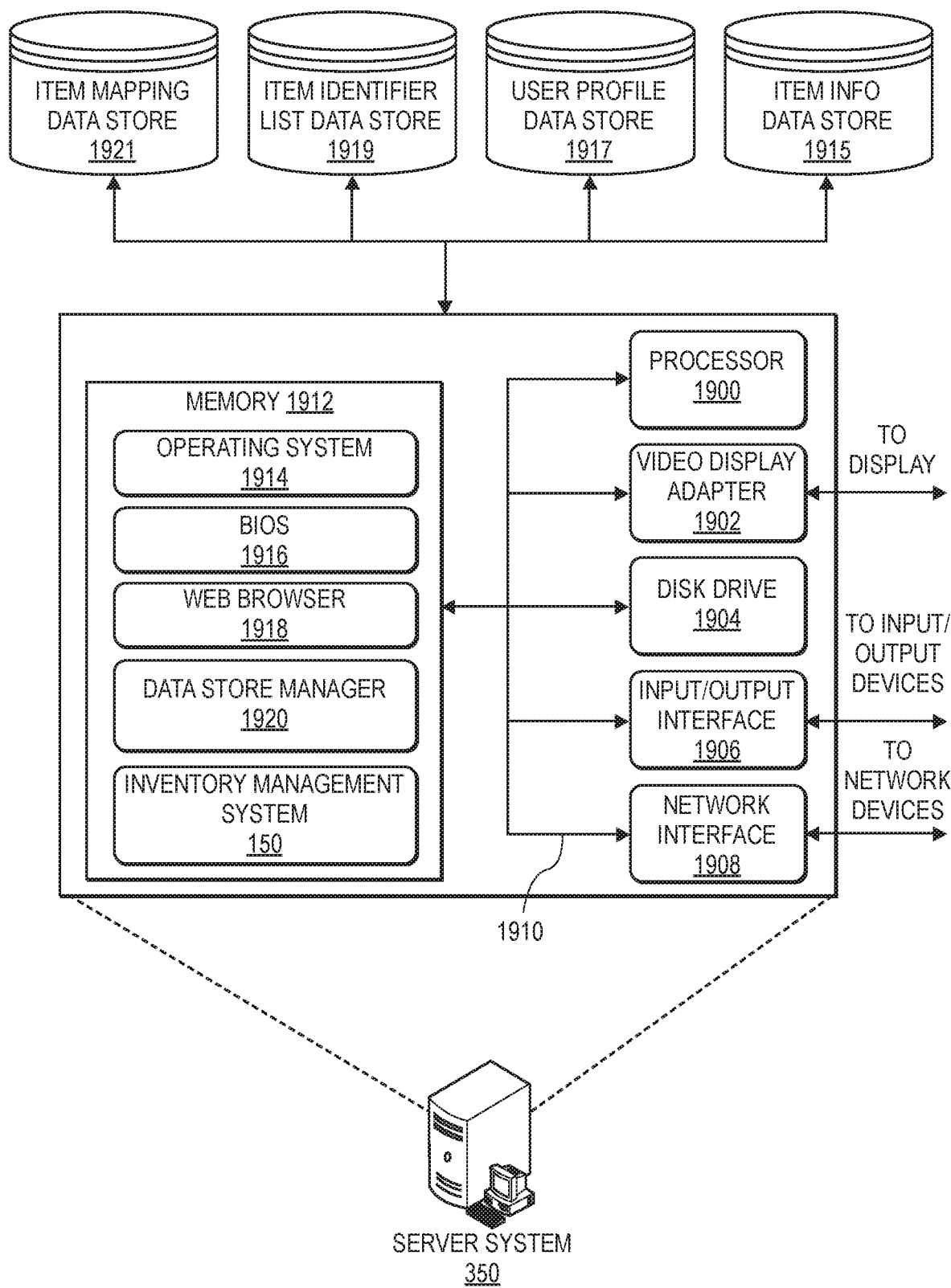
FIG. 19 is a block diagram of an illustrative implementation of a server system that may be used with various implementations.

The inventory management system maintains item information in the item information data store 1915 (FIG. 19). Item information may include any information about the item, such as the item type, size, shape, weight, dimensions (length, width, height), color, etc. Likewise, as discussed in further detail below with respect to FIG. 12, object detection models, such as HOG models, may be determined for inventory items and stored as part of the item information in the item information data store. For example, as items are added to inventory, images of the items may be obtained that include representations of the item from different angles, at different lighting conditions, etc. Each image may be processed to generate a HOG descriptor, also referred to as a HOG model. HOG models describe an object appearance and shape within an image by the distribution of gradients or edge directions. HOG models can be established by dividing an image into cells and compiling a histogram, also referred to herein as a model feature vector, of gradient directions or edge orientations for the pixels within the cell. The combination of these model feature vectors are represented as the HOG model for the object represented in the image.

As items 1135 are added to an inventory location 1102, the item type for the item placed at an inventory location is associated with the inventory location 1102. Likewise, item quantities may be added or updated as items are stocked or added into inventory locations. In some implementations, item type determination and/or item quantity at stocking may be provided by a user (e.g., stocking agent). Alternatively, or in addition thereto, images of the items as they are added to the inventory location may be detected and the item identified using one or more of feature detection, edge detection, etc. Likewise, quantities or item counts may be determined as items are added using the implementations described herein.

Figure 12:
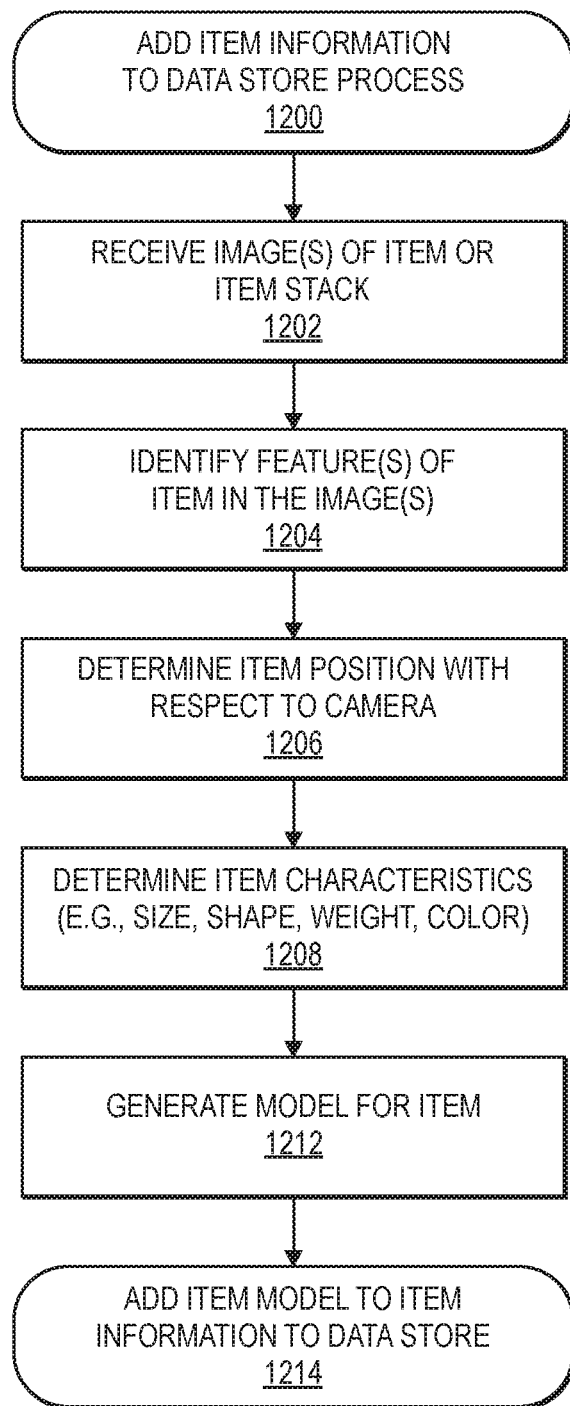
FIG. 12 is a flow diagram of an example process for adding item information to an item information data store, according to an implementation.

FIG. 12 is a flow diagram of an example process 1200 for adding item information to an item information data store, according to an implementation. The process of FIG. 12 and each of the other processes and sub-processes discussed herein may be implemented in hardware, software, or a combination thereof. In the context of software, the described operations represent computer-executable instructions stored on one or more computer-readable media that, when executed by the one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 1200 begins by receiving one or more images of an item or a stack of items, as in 1202. For example, when an item is received into a materials handling facility at the receiving area 120 (FIG. 1), images of the item at different positions, orientations, stacking configurations, lighting conditions, etc. may be captured and provided to the example process 1200. For example, when items are received at the receiving area of a materials handling facility they are identified by the receiving agent. The receiving agent may scan a bar code or other identifier to identify the item that is being received. During receive, one or more images of the item(s) may be captured. In some implementations, the capturing of images may be performed at different stages of the receive process. For example, if the items are being segmented or otherwise separated for storage in the storage area, images may be captured as the items are separated. In other implementations, images may be captured when the items have completed receive but before they are placed into a storage area.

In another example, images of items may be obtained as the items are added to an inventory location. For example, as a user adds items to an inventory location, after each item addition (or group of item additions), the user may indicate the item addition and an image of the item or group of items may be obtained. To illustrate, a user may be adding items 1135-6 (FIG. 11) to inventory location 1102-6. After each item is added, an image of the stack of items may be obtained and associated with an item count based on the number of items identified as added by the user.

In some implementations, images of an item may be captured in a controlled environment such that the images are taken from a known distance from the camera, at known pan, tilt, zoom positions and with particular lighting conditions.

In some implementations, if items will be vertically stacked at an inventory location, an image of the item at every stacking configuration e.g., single item, two stacked items, three stacked items, etc., may be obtained by a camera at a defined distance from the item, as part of the example process 1200. Vertically stacked items will be at different distances from the camera and will thus appear larger or smaller depending in their distance from the camera. Alternatively, rather than actually stacking items and obtaining images of the stacked items, an image of a single item may be obtained and the image may be altered utilizing an algorithm to simulate the representation of the item in a stacked configuration. In such an implementation, the image of the item may be tuned when the items are actually stacked at the inventory location. For example, if a simulated image is established representing three stacked items, during inventory stocking the user may identify that three items have been stacked. The simulated image may be tuned based on an actual representation of the stacked items.

If items are to be stacked horizontally at an inventory location, images of the items at different horizontal distances from the camera may obtained and/or simulated. Horizontally stacked items will be at different distances from the camera and will thus appear larger or smaller depending on their horizontal distance from the camera(s).

The example process 1200 may process each received image and determine features of the item included in the images, as in 1204. In some implementations, the image may be processed in grey-scale to identify features and/or may be processed using a HOG algorithm to determine a distribution of image gradients or edge direction that are used to generate model feature vectors.

Features of an item may be anything or a combination of things that are identifiable for that item. For example, a feature may be the shape of the item, a color of the item, the label or logo on the item, the wording on the item, a pattern on the item, a symbol on the item, a character on the item, a word on the item, a number on the item, a texture of the item, a gradient of the item, a reflectivity of the item, an edge of the item, and the like. For example, "Item A" identified on a label positioned on a top of a package and surrounded by a circle may be a feature representative of the item. As will be appreciated, depending on the orientation of the item when the image is captured, different features may be identified. To illustrate, an image of a can of soup may be processed to identify features, such as the manufacturer's logo and the name of the variation of the soup and a HOG algorithm may be utilized to generate feature vectors representative of the identified feature. As the position of the item changes with respect to the camera, the features and corresponding feature vectors may also change.

In some implementations, depth information may also be determined and associated with the identified features for each image, as in 1206. For example, if the camera that obtains the information is a stereo camera, or other depth sensing camera, such as a camera of a multiple-camera apparatus, three-dimensional coordinates of each pixel representative of the item may be determined with respect to a center-point of the camera.

In addition to determining features and depth information, the item characteristics (e.g., size, shape, weight, dimensions, color) are determined, as in 1208. Such information may be obtained from a variety of sources and maintained by the inventory management system. For example, the manufacturer or distributor of the item may provide the item characteristics. In some implementations, some or all of the item characteristics may be determined as the item is added to inventory.

Utilizing the determined features, depth information from the perspective of the camera and the item characteristics, item models are generated for each received image, as in 1210. As discussed further below, the item models contain information for matching images obtained of items in an inventory location to periodically count inventory located at the inventory location. Each model is associated with the item type and stored in the item information data store, as in 1212. Multiple item models are beneficial as they increase the accuracy of item counting at each inventory location. Each item model may include one or more HOG models. Also, because the item type at an inventory location is known, quick processing may be performed to determine if features of an item represented in an image correspond to a model, because item identification is not needed.

Figure 13:
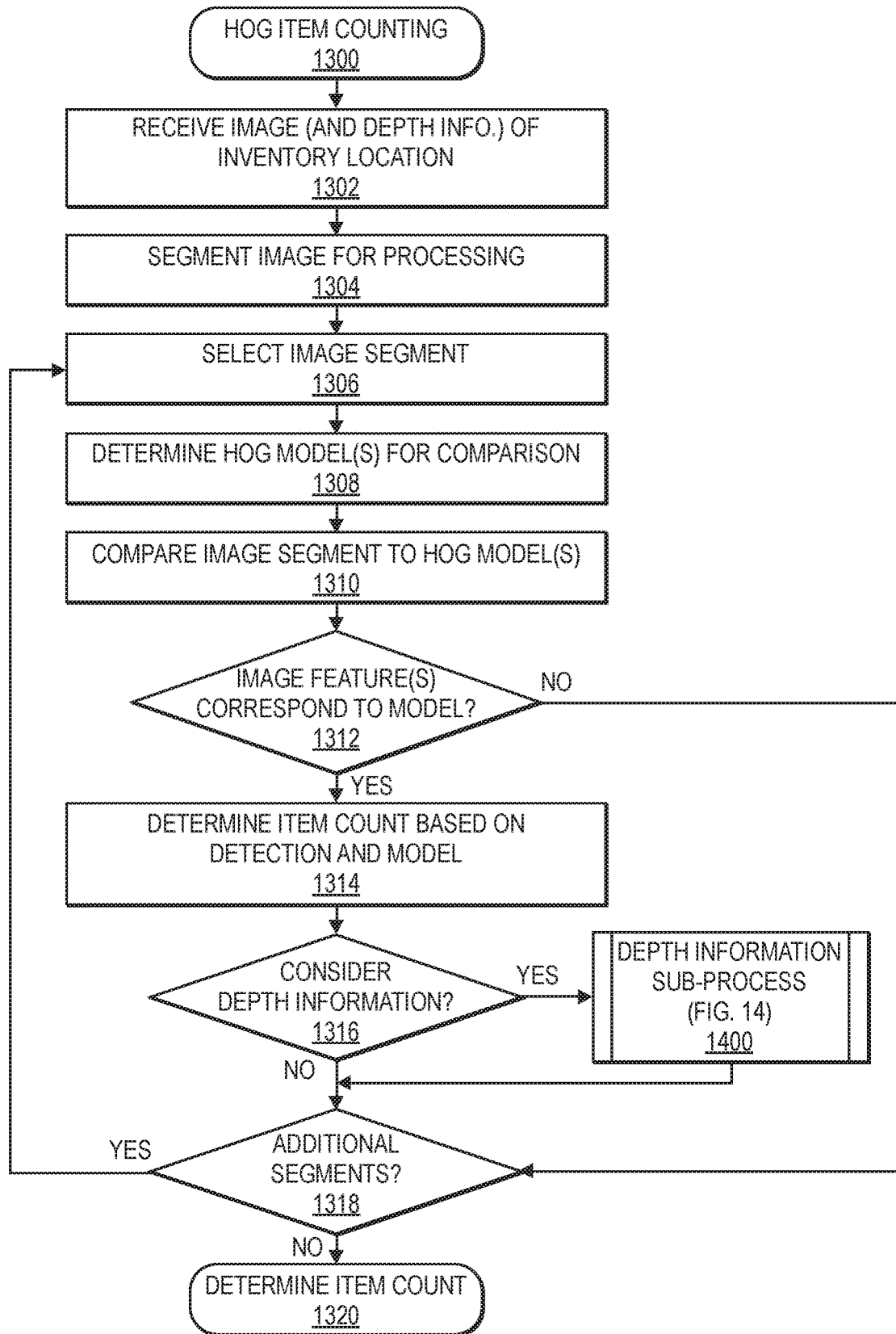
FIG. 13 is a flow diagram of an example process for using a histogram of oriented gradients algorithm to count items at an inventory location, according to an implementation.

FIG. 13 is a flow diagram of an example process 1300 for using a HOG algorithm to count items at an inventory location, according to an implementation. The example process 1300 begins by receiving an image, and optionally depth information, of an inventory location that includes one or more items, as in 1302. Images may be received periodically, at defined intervals, in response to actions or activities, may be requested by the example process 1300, etc. Upon receiving the image, the image is segmented for processing as in 1304. Representations of items may appear different depending on their distance from the camera that obtains the image. For example, items closer to the camera that obtains the image will appear larger. Items farther away from the camera will appear smaller. Because items may be stacked horizontally, images may be segmented or divided into different sections (e.g., front, middle, back of the inventory location). While the example refers to segmenting the image, it will be appreciated that such segmentation may be for processing purposes only and the image itself may remain unchanged. For example, the image may be segmented such that different portions of the image are processed using different HOG models.

In some examples, the stacking configuration of the inventory items is known and the image may be segmented according to the stacking configuration. For example, if the item is vertically stacked with no horizontal stacking, the image may not be segmented. In dcomparison, if the items are horizontally stacked five deep on the inventory shelf, the image may be segmented into five segments from the front of the inventory shelf to the back of the inventory shelf.

The example process 1300 then selects an image segment, as in 1306, and determines corresponding HOG models for comparison with the selected image segment, as in 1308. As discussed above, images of an item may be obtained and/or simulated at different positions with respect to a camera, different stacking configurations, etc. and HOG models that could potentially correspond with the selected image segment may be determined based on that information. For example, nine different HOG models may be maintained that correspond to images of items taken near a camera (e.g., toward the front of an inventory shelf): a first HOG model for a single item with zero degree positional offset (rotation) from the camera, a second HOG model for a single item with a 45 degree offset, a third HOG model for a single item with a 90 degree offset, a fourth HOG model for a stack of two items with a zero degree offset, a fifth HOG model for a stack of two items with a 45 degree offset, a sixth HOG model for a stack of two items with a 90 degree offset, a seventh HOG model for a stack of three items with a zero degree offset, an eighth HOG model for a stack of three items with a 45 degree offset, and a ninth HOG model for a stack of two items with a 90 degree offset. As will be appreciated, additional or fewer HOG models may be maintained for different item types, configurations and/or image segments.

The selected image segment is then compared to each of the determined HOG models, as in 1310. Comparing the image segment may include processing the image to determine HOG feature vectors of the received image and then comparing those HOG feature vectors with the model feature vectors of the determined HOG model(s). The comparison of the image feature vectors to the model feature vectors of the HOG model(s) may be computationally quick because the item need not be identified. In some implementations, a determination may only be made as to the similarity between the item feature vectors and the model feature vectors of each HOG model. If the similarity exceeds a threshold, it is determined that the image feature vectors of the received image correspond to the model feature vectors.

In some implementations, rather than maintaining HOG models for different item orientations and/or different stacks and thus distances of items from the camera, fewer HOG models may be maintained and the orientation or size of the received image may be altered and compared multiple times with the same HOG model. For example, a HOG model may be maintained for the item at a zero degree offset and at a defined distance from the camera. The feature vectors of the received image may be compared to the model feature vectors in its normal orientation and then the image may be rotated to different orientations (e.g., 45 degrees, 90 degrees) and compared again at each different orientation. If a match is determined, the orientation of the received image that resulted in the match may be determined.

Likewise, rather than maintaining models for different stack configurations of items, and thus representations of an image at different vertical distances from the camera, a single model may be maintained at a defined distance. When comparing the received image, the image feature for the received image may be compared at the default magnification of the image and also compared at different magnification levels, each representing a potential item distance from the camera. If a match is determined, the magnification level and effective item distance from the camera corresponding to the match is determined. Alternatively, rather than processing the entire image, smaller segments of the image may be processed, thereby effectively establishing a different view or magnification of the image.

After comparing the image feature vectors with the model feature vectors, a determination is made as to whether the image feature vectors correspond to one or more HOG models, as in 1312.

If it is determined that one or more feature vectors of the image correspond to a HOG model, an item count is determined based on the frequency of detection and the corresponding model, as in 1314. For example, referring to FIG. 15, if the HOG model is representative of the label, the comparison of the first segment 1504 of the image may result in two features 1502-1, 1502-2 corresponding to the HOG model. In this example, the item count from the image segment 1504 may be two. As another example, an item count may depend on the model determined to correspond to the image feature. For example, if the model determined to correspond to the item feature is a model generated from an image of the item when stacked vertically on top of two other items, it may be determined that the item count for the item is three.

Figure 14:
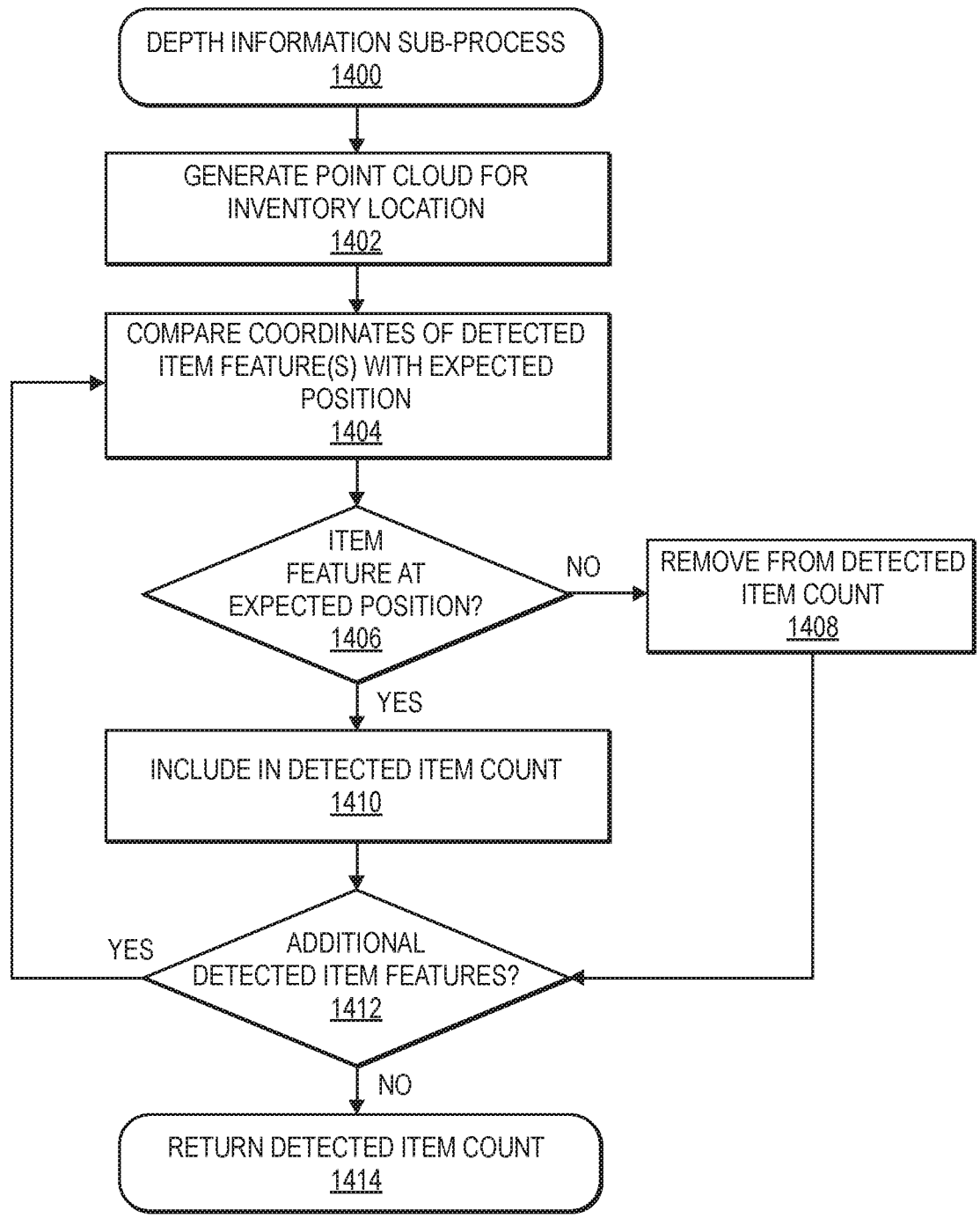
FIG. 14 is a flow diagram of an example sub-process for using depth information to supplement a histogram of oriented gradients algorithm process for counting items at an inventory location, according to an implementation.
Figure 15:
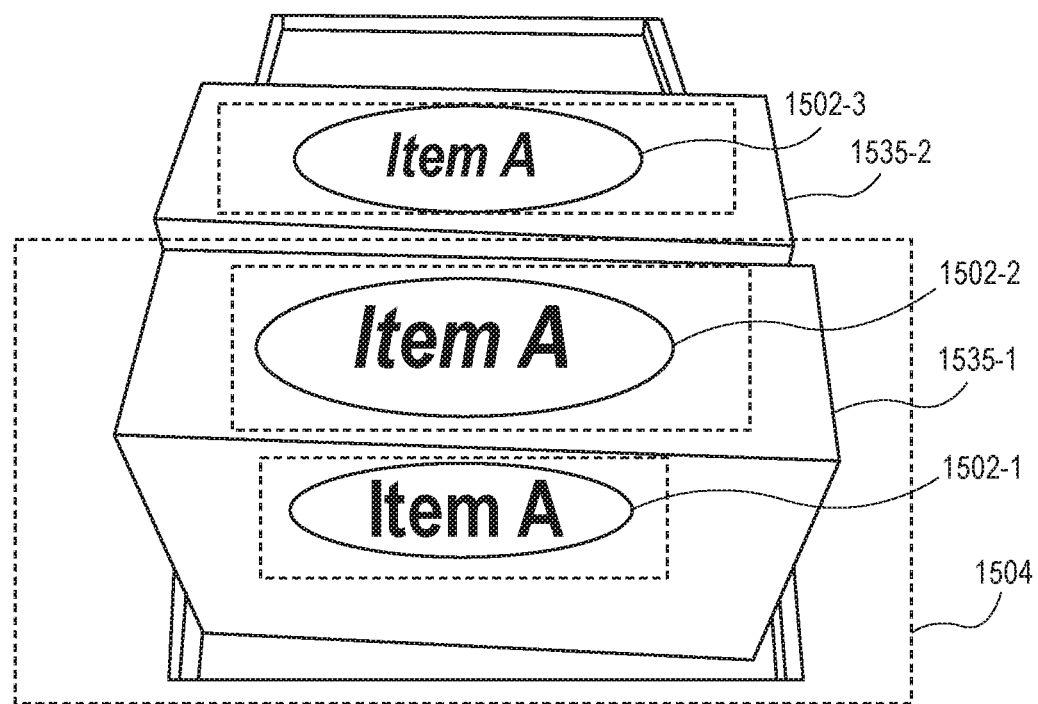
FIG. 15 is a representation of item features detected using a histogram of oriented gradients algorithm, according to an implementation.

Because features may be detected multiple times for a single item, as illustrated in FIG. 15, one or more error correction techniques may be utilized. For example, because the item type is known, and it may be known that the first item represented in a received image will always include two instances of the feature, the total item count may be decremented by one. In another example, returning to FIG. 13, depth information relating to the image may be considered, as in 1316. If it is determined that depth information is to be considered in counting the items represented in an image segment, the example depth information sub-process 1400 is performed. The example depth information sub-process is discussed in further detail below with respect to FIG. 14.

Upon completion of the depth information sub-process 1400, if it is determined that depth information is not to be considered, or if it is determined that no image features correspond to model feature vectors of the selected HOG models, a determination is made as to whether additional image segments remain for processing, as in 1318. If additional image segments remain for processing, the example process 1300 returns to block 1306 and continues. However, if no additional image segments of the received image remain for processing, the total item count is determined for the received image based on a sum of the item count for each segment of the image, as in 1320.

FIG. 14 is a flow diagram of an example sub-process 1400 for using depth information to supplement a HOG algorithm process for counting items at an inventory location, according to an implementation. The example sub-process 1400 begins by generating a point cloud for the inventory location and/or an image segment of the inventory location, as in 1402. A point cloud is a three-dimensional mapping of items represented in the image data. A point cloud is a set of data points in a three-dimensional coordinate system representative of the horizontal coordinates (x, y) of an item and depth coordinates (z) for the item. The point cloud provides a three-dimensional representation of an external surface of an item.

The position of each pixel represented in the image is aligned according to coordinates (horizontal and vertical) of the inventory location. The depth information corresponding to each pixel is also transposed from the distance from the camera to a distance from the inventory shelf of the inventory location. To set the pixel coordinates to correspond with the inventory location, the position of the camera with respect to the inventory location is known and the pixel coordinate/depth may be mapped from the camera position to the inventory location coordinates.

Utilizing the information from the generated point cloud, coordinates of a detected item feature are compared with expected positions of the item feature, as in 1404. For example, it may be known that the item features to be detected are to be on the top of the items. For example, referring again to FIG. 15, item features 1502 that are to be detected are those positioned on the top of the items 1535. Item features 1502 on the top of the items, such as item features 1502-2, 1502-3, will have consistent depth (z) information because they are approximately parallel with the inventory shelf. However, item features on the sides of the items 1535, such as item feature 1502-1, will have varying depth information because they are approximately vertical with respect to the inventory shelf. In other implementations, other orientations and/or positions of item features may be considered.

Based on the comparison of the coordinates of the detected item feature with the expected positions, a determination is made as to whether the detected item feature is at the expected positions, as in 1406. If it is determined that the detected item feature is not at the expected positions, the item count may be reduced because the item feature is not representative of a distinct item, 1408. However, if it is determined that the item feature is at the expected item position, the item is included in the item count, as in 1410.

After including or removing the item feature from the item count, the example sub-process 1400 determines if there are additional detected item features to be considered, as in 1412. If it is determined that there are additional detected item features, the example sub-process 1400 returns to block 1404 and continues. However, if it is determined that there are no additional detected item features to consider, the example sub-process 1400 returns the detected item count, as in 1414.

Figure 16:
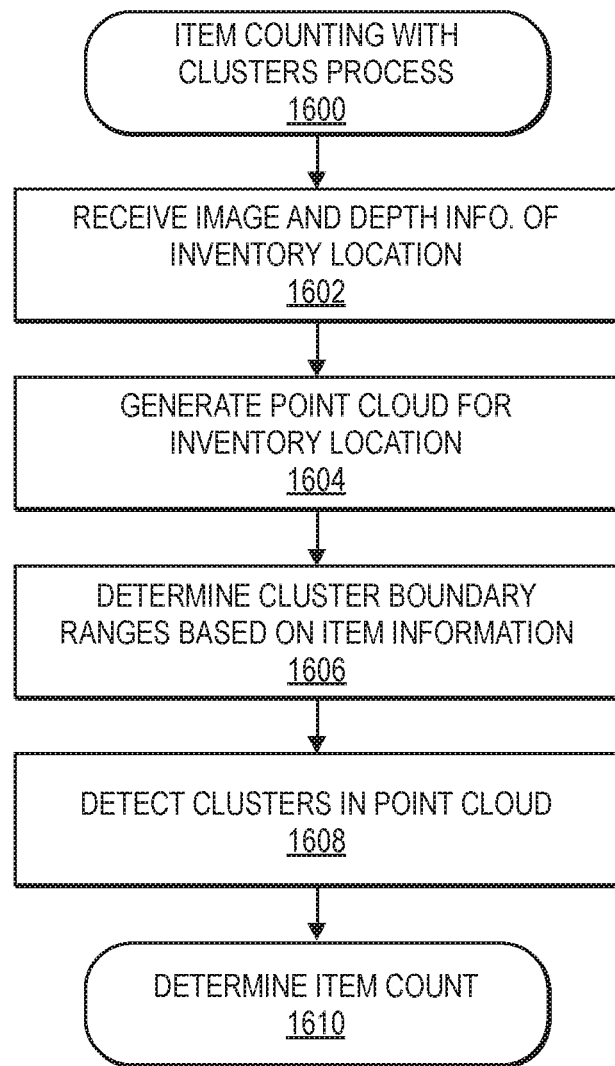
FIG. 16 is flow diagram of an example process for counting items using depth information and clusters, according to an implementation.

FIG. 16 is flow diagram of an example process 1600 for counting items using depth information and clusters, according to an implementation. The example process 1600 begins by receiving from a camera at an inventory location an image of the inventory location, as in 1602. The received image includes depth information relating to items represented in the image. Similar to the discussion above with respect to FIG. 14, the depth information may include three-dimensional coordinates for each item represented by pixels in the image.

Utilizing the depth information for pixels of the image, a point cloud is generated for the inventory location, as in 1604. Again, similar to the point cloud generated with respect to FIG. 14, the position of each pixel represented in the image is aligned according to coordinates (horizontal and vertical) of the inventory location. The depth information corresponding to each pixel is also transposed from the distance from the camera to a distance from the inventory shelf of the inventory location.

Figure 17:
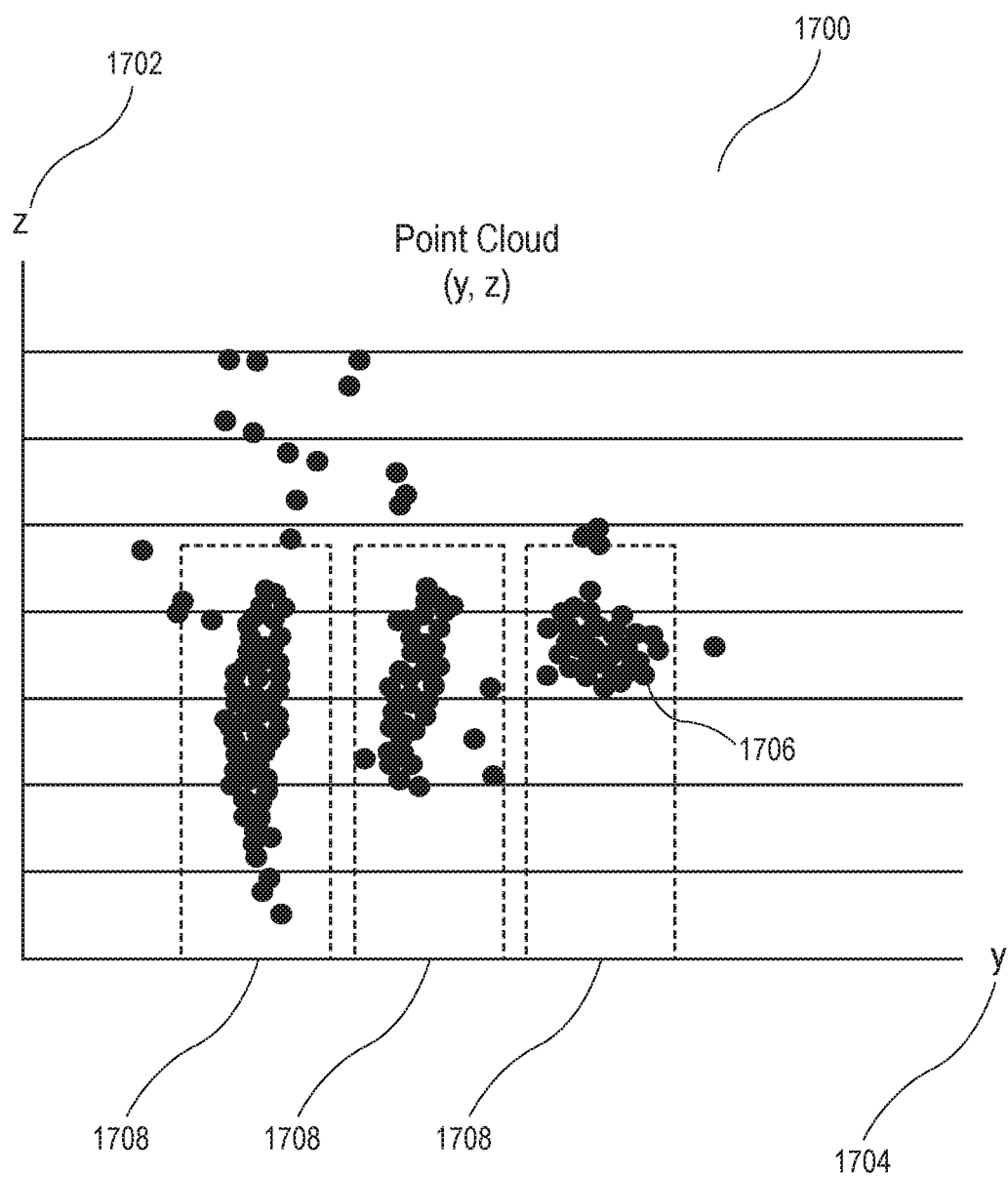
FIG. 17 is a representation of a graph illustrated clusters detected from items at an inventory location, according to an implementation.

Referring to FIG. 17, represented is a two-dimensional side-view 1700 of a point cloud representation of items at an inventory location. The representation includes the position of point cloud points 1706 at the determined height (z) 1702 from the inventory shelf and the length (y) 1704 from a front edge of the inventory shelf toward a rear of the inventory shelf.

Returning to FIG. 16, based on item information for the items represented in the received image, which are known because the item type for the items stored at the inventory location are known, one or more cluster boundary ranges may be determined, as in 1606, and clusters in the point cloud are determined, as in 1608. For example, if the height, length, and width of the items are known, the cluster boundaries may be determined based on those known dimensions. Referring again to FIG. 17, cluster boundaries 1708 that are 105% of the height, length, and width of the items are established and positioned around clusters of points 1706 or areas with densely populated regions of points represented in the two-dimensional point cloud 1700. Any points of the point cloud that fall outside a positioned cluster boundary may be ignored.

As illustrated, because the camera is positioned on an underneath surface of a shelf above the inventory location, the image includes a representation of the majority of the item closest to the front edge of the inventory shelf, a partial representation of the second item, because the second item is partially occluded from the field of view of the camera by the first item, and only a top portion of the third item, because the third item is also partially occluded from the field of view of the camera. Because the positions of the points have been aligned in the coordinate system of the inventory location, the points appear similar to how the items are actually positioned on the inventory shelf. The cluster boundaries 1708 may be positioned around each cluster and anchored on the base of the inventory shelf. For example, while the horizontal distance of the items may vary, especially for bags, the maximum vertical distance of the item will be from the inventory shelf because the items are sitting on the inventory shelf.

Returning to FIG. 16, based on the determined clusters, an item count for the inventory location is determined, as in 1610. Specifically, one item may be counted for each cluster.

Figure 18:
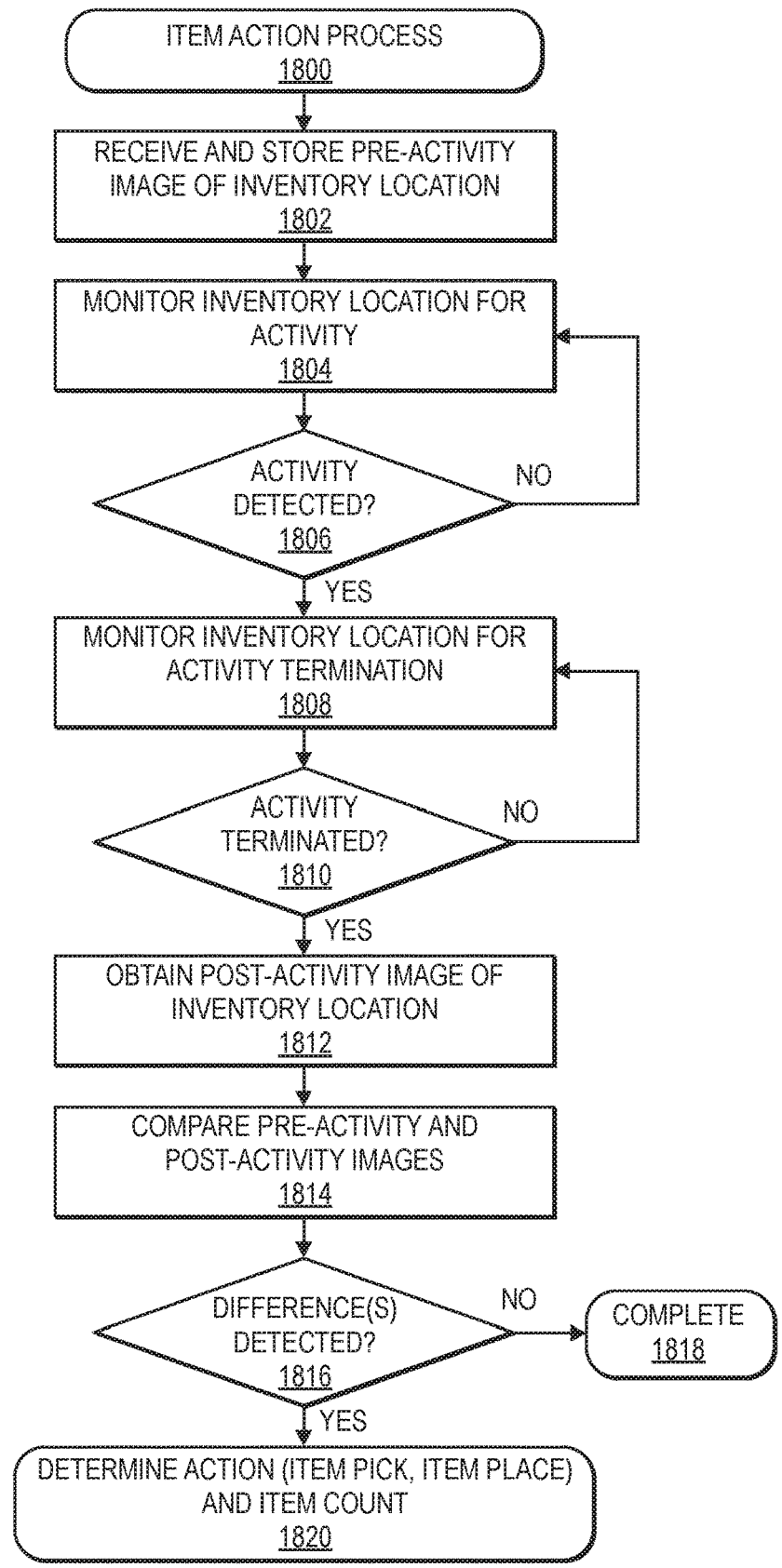
FIG. 18 is a flow diagram of an example process for determining an action at an inventory location, according to an implementation.

FIG. 18 is a flow diagram of an example process 1800 for determining an item action at an inventory location, according to an implementation. The example process beings by receiving and storing a pre-activity image of an inventory location, as in 1802. A pre-activity image may be obtained at any time. For example, a pre-activity image may be obtained and stored after inventory is stocked at an inventory location, upon completion of a prior activity, periodically, at the request of the example process 1800, etc. In some implementations, images of an inventory location may be periodically obtained and temporarily stored until another image is obtained.

The example process 1800 monitors the inventory location for activity, as in 1804. An activity may be any occurrence at the inventory location, such as a user approaching the inventory location, a user reaching into the inventory location, a movement of an item, etc. Monitoring for an activity may be done, for example, by comparing pixels of adjacent frames of video of the inventory location to determine difference in the color values and/or depth information between adjacent frames exceeds defined threshold. Alternatively, motion or pressure sensors (input component) may be monitored for changes exceeding a defined threshold. When a change exceeding a threshold is detected by an input component, a change notification may be generated indicating that an activity has occurred at the inventory location. The change notification may identify the inventory location, the time of the activity and the change that was detected. Any variety of input components may be utilized to monitor for activity at the inventory location. For example, the input components could be one or more of a pressure sensor, a load cell, a RFID tag reader, or a motion sensor.

A determination is made as to whether an activity has been detected, as in 1806. If it is determined that an activity has not been detected, the example process 1800 returns to block 1804 or continues. However, if it is determined that an activity has been detected at the inventory location, the example process 1800 may monitor the location for termination of the activity, as in 1808. Similar to monitoring for an activity, any one or more of the same inputs may be monitored and utilized to determine when an activity has terminated. For example, pixels of adjacent frames of video may be compared to determine when the difference between the pixel colors and/or depth of the adjacent frames falls below a threshold.

A determination is made as to whether the activity as terminated, as in 1810. If it is determined that the activity has not terminated, the example process returns to block 1808 and continues. However, if it is determined that the activity has terminated, a post-activity image of the inventory location is obtained, as in 1812.

Upon obtaining a post-activity image, the pre-activity image and the post activity image are compared, as in 1814. Comparison of pre-activity and post-activity images may include a comparison of pixels between the images to determine whether the color values and/or depth information for the pixels of the images differ by more than a defined threshold. In other implementations, each of the pre-activity image and the post-activity image may be processed using any of the above discussed item counting techniques to determine an item count and a determination may be made as to whether the item counts between the pre-activity image and the post activity image differ.

In some implementations, a pixel comparison may be performed first and if it is determined that a difference between the pixel color values and/or depth information has changed beyond a threshold, item counts for both images may be determined to determine whether an action (e.g., item pick, item place) has occurred. In some examples, an item may be moved on the inventory shelf, which may result in a difference between pixel comparisons but would not result in a change in the item count.

Based on the comparison, a determination is made as to whether a difference is detected, as in 1816. If it is determined that no difference between the pre-activity image and the post-activity image is detected, the example process completes, as in 1818. However, if a difference is detected, the action that occurred is determined and a count of items involved in the action are determined, as in 1820. For example, the pre-activity image may be processed using any of the above techniques and an item count determined for the inventory location. Likewise, a similar process may be performed on the post-activity image to determine an item count for the inventory location. If the item count determined for the pre-activity image is less than the item count for the post-activity image, it is determined that an item place occurred. Likewise, the difference between the two item counts represents the number of items involved in the item place (i.e., placed at the inventory location). In comparison, if the item count determined for the pre-activity image is more than the item count for the post-activity image, it is determined that an item pick occurred. Likewise, the difference between the two item counts represents the number of items involved in the item pick (i.e., picked from the inventory location).

FIG. 19 is a pictorial diagram of an illustrative implementation of a server system, such as the server system 350 that may be used in the implementations described herein. The server system 350 may include a processor 1900, such as one or more redundant processors, a video display adapter 1902, a disk drive 1904, an input/output interface 1906, a network interface 1908, and a memory 1912. The processor 1900, the video display adapter 1902, the disk drive 1904, the input/output interface 1906, the network interface 1908, and the memory 1912 may be communicatively coupled to each other by a communication bus 1910.

The video display adapter 1902 provides display signals to a local display (not shown in FIG. 19) permitting an operator of the server system 350 to monitor and configure operation of the server system 350. The input/output interface 1906 likewise communicates with external input/output devices not shown in FIG. 19, such as a mouse, keyboard, scanner, or other input and output devices that can be operated by an operator of the server system 350. The network interface 1908 includes hardware, software, or any combination thereof, to communicate with other computing devices. For example, the network interface 1908 may be configured to provide communications between the server system 350 and other computing devices via the network 302, as shown in FIG. 3.

The memory 1912 generally comprises random access memory (RAM), read-only memory (ROM), flash memory, and/or other volatile or permanent memory. The memory 1912 is shown storing an operating system 1914 for controlling the operation of the server system 350. A binary input/output system (BIOS) 1916 for controlling the low-level operation of the server system 350 is also stored in the memory 1912.

The memory 1912 additionally stores program code and data for providing network services that allow the inventory management system 150 to identify users and/or items within the materials handling facility. Accordingly, the memory 1912 may store a browser application 1918. The browser application 1918 comprises computer executable instructions that, when executed by the processor 1900, generate or otherwise obtain configurable markup documents such as Web pages. The browser application 1918 communicates with a data store manager application 1920 to facilitate data exchange between the item information data store 1915, the user profile data store 1917 and/or the item identifier list data store 1919.

As used herein, the term "data store" refers to any device or combination of devices capable of storing, accessing and retrieving data which may include any combination and number of data servers, databases, data storage devices and data storage media in any standard, distributed or clustered environment. The server system 350 can include any appropriate hardware and software for integrating with the data stores 1915-1919 as needed to execute aspects of the inventory management system 150.

The data stores 1915-1919 can include several separate data tables, databases or other data storage mechanisms and media for storing data relating to a particular aspect. For example, the data stores 1915-1919 illustrated include mechanisms for maintaining inventory information (e.g., item locations, images of item when properly positioned, depth map information for an item located on an inventory shelf, item features), user profile information, item lists associated with users, inventory tables, etc.

It should be understood that there can be many other aspects that may be stored in the data stores 1915-1919. The data stores 1915-1919 are operable, through logic associated therewith, to receive instructions from the server system 350 and obtain, update or otherwise process data in response thereto.

The memory 1912 may also include the inventory management system 150, discussed above. The inventory management system 150 may be executable by the processor 1900 to implement one or more of the functions of the server system 350. In one implementation, the inventory management system 150 may represent instructions embodied in one or more software programs stored in the memory 1912. In another implementation, the inventory management system 150 can represent hardware, software instructions, or a combination thereof.

The server system 350, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 19. Thus, the depiction in FIG. 19 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing system, comprising:
    one or more processors; and
    a memory storing program instructions that when executed by the one or more processors cause the one or more processors to at least:
        receive, from a camera coupled to an underneath side of a first shelf of an inventory location, the camera having a field of view oriented toward at least a portion of an upper side of a second shelf positioned below the first shelf, an image;
        process the image to determine a plurality of item feature vectors that correspond to items represented in the image;
        compare the plurality of item feature vectors with first model feature vectors of a first item model maintained in a data store to determine a first similarity score;
        compare the plurality of item feature vectors with second model feature vectors of a second item model maintained in the data store to determine a second similarity score;
        determine that the first item model has a highest similarity score; and
        determine a quantity of the item at the second shelf based at least in part on a stored item quantity associated with the first item model.

2. The computing system of claim 1, wherein the program instructions when executed by the one or more processors further cause the one or more processors to at least:
    determine an item type associated with the second shelf; and
    select the first item model and the second item model based at least in part on the item type, wherein the first item model and the second item model are representative of the item type.

3. The computing system of claim 1, wherein the program instructions when executed by the one or more processors further cause the one or more processors to at least:
    receive depth information indicating a distance between the camera and at least one item at the second shelf;
    compare the depth information with stored depth information corresponding to the first item model; and
    wherein the quantity of the item at the second shelf is further based at least in part on the depth information.

4. The computing system of claim 1, wherein the program instructions when executed by the one or more processors further cause the one or more processors to at least:
    segment the image into a plurality of image segments; and
    determine the plurality of item feature vectors of a first segment of the plurality of image segments.

5. The computing system of claim 1, wherein the image is processed using at least one of an edge detection algorithm or an object detection algorithm.

6. A computer-implemented method of maintaining an inventory count of a quantity of an item at an inventory location, comprising:
    maintaining, in a data store, a plurality of item models corresponding to an item type at the inventory location, wherein:
        each item model is representative of a different quantity of the item and includes a plurality of model feature vectors; and
        each item model represents a quantity of the item;
    receiving, from a camera positioned at a fixed distance from the inventory location, an image of the inventory location;
    receiving information indicating a distance between the camera and an item positioned at the inventory location;
    processing the image to determine a plurality of item feature vectors that correspond to items represented in the image;
    for each of the plurality of item models, comparing the plurality of item feature vectors with the plurality of model feature vectors of the item model to determine a similarity score between the plurality of item feature vectors and the plurality of model feature vectors;
    determining an item model with a highest similarity score;
    compare the information with stored information corresponding to the item model having the highest similarity score; and
    determine a quantity of the item at the inventory location based at least in part on a stored item quantity associated with the item model having the highest similarity score and based at least in part on the item model having the highest similarity score.

7. The computer-implemented method of claim 6, further comprising:
    generating, during an inventory stocking of the inventory location, each of the plurality of item models.

8. The computer-implemented method of claim 7, wherein generating includes:
    receiving an indication of an inventory count of items at the inventory location;
    receiving an image of the inventory location;
    processing the image to generate a plurality of feature vectors; and
    storing, in the data store, an item model that includes the plurality of feature vectors and the inventory count.

9. The computer-implemented method of claim 8, further comprising:

receiving depth information indicating a distance between the camera and the item positioned at the inventory location; and wherein the item model includes the depth information.

10. The computer-implemented method of claim 6, further comprising:

determining an item type associated with the inventory location; and selecting the plurality of item models based on the item type associated with the inventory location and the item type corresponding to each of the plurality of item models.

11. The computer-implemented method of claim 6, wherein each of the plurality of item models further indicate a plurality of item characteristics of the item type.

12. The computer-implemented method of claim 11, wherein the plurality of item characteristics include one or more of a size of the item, a shape of the item, a weight of the item, a dimension of the item, or a color of the item.

13. The computer-implemented method of claim 6, further comprising:

receiving weight information indicating a weight measured at the inventory location; and wherein determining the quantity of the item at the inventory location is further based at least in part on the weight information.

14. The computer-implemented method of claim 6, wherein each item model includes one or more histogram of object gradients (HOG) models.

15. The computer-implemented method of claim 14, wherein a HOG model is established based on one or more of a position of an item with respect to the camera, a location of the item with respect to the camera, or an orientation of the item with respect to the camera.

16. A system, comprising:

a camera coupled to an underneath side of a first shelf of an inventory location, the camera having a field of view oriented toward at least a portion of an upper side of a second shelf positioned below the first shelf, the camera configured to at least:

obtain an image of the field of view; and provide the image to a computing system communicatively coupled to the camera;

the computing system including:

one or more processors;

a memory coupled to the one or more processors and storing program instructions that when executed by the one or more processors cause the one or more processors to at least:

determine a stored item model corresponding to the second shelf, the stored item model corresponding to an item type of an item at the inventory location;

determine an item dimension representative of at least one of a height, a width, or a length of the item;

determine, based at least in part on the stored item model and the item dimension, a distance between the item and the camera; and compute an item count based at least in part on:

the distance between the item and the camera; and the item dimension.

17. The system of claim 16, wherein the program instructions when executed by the one or more processors further cause the one or more processors to at least:

determine a second distance between the upper side of the second shelf and the camera; and wherein the item count is further based at least in part on:

a difference between the distance and the second distance; and the item dimension.

18. The system of claim 17, wherein the second distance is maintained in an inventory location data store.

19. The system of claim 16, wherein the program instructions when executed by the one or more processors further cause the one or more processors to at least:

determine a second distance between a front edge of the second shelf and the item;

determine a depth of the second shelf from the front edge of the second shelf to a back of the second shelf; and compute the item count based at least in part on:

a difference between the second distance and the distance, the depth of the second shelf; and the item dimension of the item.

20. The system of claim 16, wherein the program instructions when executed by the one or more processors further cause the one or more processors to at least:

process the image to determine a plurality of item feature vectors;

compare the plurality of item feature vectors with each of a plurality of model feature vectors of the stored item model; and wherein the item count is further based at least in part on the comparison of the item feature vectors and the plurality of model feature vectors.

\* \* \* \* \*

UNITED STATES PATENT AND TRADEMARK OFFICE
CERTIFICATE OF CORRECTION

| | | |
|---|---|---|
| PATENT NO. | : 10,789,483 B1 | Page 1 of 1 |
| APPLICATION NO. | : 16/195016 | |
| DATED | : September 29, 2020 | |
| INVENTOR(S) | : Xiaofeng Ren et al. | |

It is certified that error appears in the above-identified patent and that said Letters Patent is hereby corrected as shown below:

On the Title Page

Item (72), Seventh inventor's first name is Gopi Prashanth - with no middle name.

Signed and Sealed this
Fourteenth Day of September, 2021

Drew Hirshfeld
*Performing the Functions and Duties of the
Under Secretary of Commerce for Intellectual Property and
Director of the United States Patent and Trademark Office*